United States Patent
Yasuo et al.

(10) Patent No.: US 12,449,391 B2
(45) Date of Patent: Oct. 21, 2025

(54) CELL SIGNAL MEASUREMENT ELECTRODE PLATE AND INFORMATION PROCESSING DEVICE PROVIDED WITH SAME

(71) Applicant: SHARP KABUSHIKI KAISHA, Sakai (JP)

(72) Inventors: Fumitoshi Yasuo, Sakai (JP); Kenichi Kitoh, Sakai (JP); Tomoko Teranishi, Sakai (JP); Chihiro Tachino, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 441 days.

(21) Appl. No.: 17/928,586

(22) PCT Filed: Apr. 21, 2021

(86) PCT No.: PCT/JP2021/016123
§ 371 (c)(1),
(2) Date: Nov. 29, 2022

(87) PCT Pub. No.: WO2021/246070
PCT Pub. Date: Dec. 9, 2021

(65) Prior Publication Data
US 2023/0243774 A1    Aug. 3, 2023

(30) Foreign Application Priority Data
Jun. 4, 2020    (JP) .................. 2020-097860

(51) Int. Cl.
*G01N 27/414*    (2006.01)
*G01N 27/27*    (2006.01)
*G01N 33/483*    (2006.01)

(52) U.S. Cl.
CPC ......... *G01N 27/27* (2013.01); *G01N 27/4148* (2013.01); *G01N 33/4836* (2013.01)

(58) Field of Classification Search
CPC .................................................. G01N 33/4836
See application file for complete search history.

(56) References Cited

U.S. PATENT DOCUMENTS

| 6,132,683 A | 10/2000 | Sugihara et al. |
| RE37,977 E | 2/2003 | Sugihara et al. |
| (Continued) | | |

FOREIGN PATENT DOCUMENTS

| JP | 2002523726 A | 7/2002 |
| WO | 2017221714 A1 | 12/2017 |

OTHER PUBLICATIONS

Milgrew et al., "A Fully-Integrated CMOS Microsensor Array for Imaging the Hydrogen Ion Activity of Living Cells", Twelfth International Conference on Miniaturized Systems for Chemistry and Life Sciences Oct. 12-16, 2008. San Diego. California. USA (Year: 2008).*

(Continued)

*Primary Examiner* — Alexander S Noguerola
(74) *Attorney, Agent, or Firm* — ScienBiziP, P.C.

(57) ABSTRACT

A cell signal measurement electrode plate includes a first transistor including a gate terminal connected to a first selection line and a source terminal connected to a second selection line, a second transistor including a gate terminal connected to a drain terminal of the first transistor, a source terminal connected to an electrode, and a drain terminal connected to a common wiring line, and a first capacitor including one capacitance electrode connected to the drain terminal of the first transistor and another capacitance electrode connected to a capacitance element potential fixing wiring line.

10 Claims, 24 Drawing Sheets

(56) References Cited

U.S. PATENT DOCUMENTS

| | | | | |
|---|---|---|---|---|
| 2011/0291673 A1* | 12/2011 | Shibata | ............. | G01N 27/4145 |
| | | | | 257/253 |
| 2018/0292347 A1* | 10/2018 | Okino | ................ | G01N 27/4148 |
| 2019/0293597 A1 | 9/2019 | Kato et al. | | |

OTHER PUBLICATIONS

International Search Report for international application No. PCT/JP2021/016123, Jun. 22, 2021, English language translation (Year: 2021).*

Written Opinion for international application No. PCT/JP2021/016123, Jun. 12, 2022, English language translation, (Year: 2022).*

* cited by examiner

CELL SIGNAL MEASUREMENT ELECTRODE PLATE AND INFORMATION PROCESSING DEVICE PROVIDED WITH SAME

TECHNICAL FIELD

One aspect of the disclosure relates to a cell signal measurement electrode plate for reading a cell signal emitted from a cell, and an information processing device provided with the same. The present application claims priority based on JP 2020-97860, filed on Jun. 4, 2020 in Japan, the contents of which are incorporated herein by reference.

BACKGROUND ART

PTL 1 discloses a cell potential measurement electrode for measuring electrophysiological activity of cells or tissues in an observation sample. The cell potential measurement electrode includes a plurality of microelectrodes on a transparent glass substrate. In the cell potential measurement electrode, 64 microelectrodes are formed in a matrix format of 8 rows×8 columns. Each of the 64 microelectrodes is connected, in a one-to-one relationship via an electrically conductive pattern for wiring lines, to a corresponding one of 64 external connection terminals placed on the four sides of the transparent glass substrate. Thus, the cell potential measurement electrode may simultaneously measure the potential of the observation sample at 64 microelectrode positions.

PTL 2 discloses a cell potential measurement device in which microelectrodes are arranged in an array on a semiconductor substrate in order to electrochemically measure the potential in a culture solution containing living cells. The cell potential measurement device uses a CMOS integrated circuit technology capable of performing high-speed operation (MHz or greater), combines multiple microelectrodes, an amplifier, an A/D converter, and the like on a single chip, and reads the potential of the observation sample at a high speed from all of the multiple microelectrodes.

CITATION LIST

Patent Literature

PTL 1: JP 2002-523726 T (published on Jul. 30, 2002)
PTL 2: WO 2017/221714 (published on Dec. 28, 2017)

SUMMARY

Technical Problem

However, in PTL 1 described above, the microelectrodes are connected to the external connection terminals in a one-to-one relationship, and thus, the measurement locations of the observation sample are limited to the positions of the 64 microelectrodes arranged in 8 rows×8 columns in a dispersed manner in the cell potential measurement electrode, and the electrode pitch is also large. Therefore, it may be difficult for a person performing the measurement to align the microelectrodes to positions where the observation sample is to be measured, and there is a need for arranging an even larger number of microelectrodes for the measurement.

In PTL 2, the CMOS integrated circuit technology capable of performing high-speed operation is used to scan all electrodes of the large number of electrodes and read the potential of the observation sample. However, in order to measure the cell potential signal of the observation sample, it is not necessarily required to scan and read all of the electrodes. It may be sufficient to scan only a small number of locations, and thus, there is a need to read the potential at a desired location of the observation sample.

There is also a desire for using a transparent substrate to accurately grasp a positional relationship between the observation sample and the electrode.

In an aspect of the disclosure, an object of the disclosure is to realize a cell signal measurement electrode plate and an information processing device including the cell signal measurement electrode plate, by which it is possible to arrange an electrode at a measurement location in an observation sample to be measured or in the vicinity of the measurement location, by a simple configuration including a transparent substrate formed of glass or the like.

Solution to Problem

To solve the problem described above, a cell signal measurement electrode plate according to one aspect of the disclosure includes a substrate, a plurality of first selection lines provided on the substrate and extending in a column direction, a plurality of second selection lines provided on the substrate and extending in a row direction, a plurality of selection circuits and a plurality of electrodes, the plurality of selection circuits and the plurality of electrodes being configured to read a cell signal emitted from a cell, being provided on the substrate, and being arranged in a matrix shape in a portion where the plurality of first selection lines and the plurality of second selection lines intersect each other, and a plurality of common wiring lines configured to read the cell signal, arranged in parallel with any one of the plurality of second selection lines and the plurality of first selection lines, and each connected via a selection circuit of the plurality of selection circuits to one row or one column of the plurality of electrodes arranged in the matrix shape, in which each of the plurality of selection circuits includes one or more unit selection circuits, and the one or more unit selection circuits each include a first transistor including a gate terminal connected to a first selection line of the plurality of first selection lines and a source terminal connected to a second selection line of the plurality of second selection lines, a second transistor including a gate terminal connected to a drain terminal of the first transistor, a source terminal connected to an electrode of the plurality of electrodes, and a drain terminal connected to a common wiring line of the plurality of common wiring lines, and a capacitance element including one capacitance electrode connected to the drain terminal of the first transistor and another capacitance electrode connected to a wiring line configured to fix a constant potential.

To solve the problem described above, an information processing device according to one aspect of the disclosure includes the cell signal measurement electrode plate according to the aspect of the disclosure.

Advantageous Effects of Disclosure

According to an aspect of the disclosure, it is possible to arrange an electrode at a measurement location in an observation sample to be measured or in the vicinity of the measurement location, by a simple configuration including a transparent substrate formed of glass or the like.

DESCRIPTION OF EMBODIMENTS

First Embodiment

Hereinafter, an embodiment of the disclosure will be described in detail.

Functional Configuration of Cell Signal Detection System 15

Figure 1:
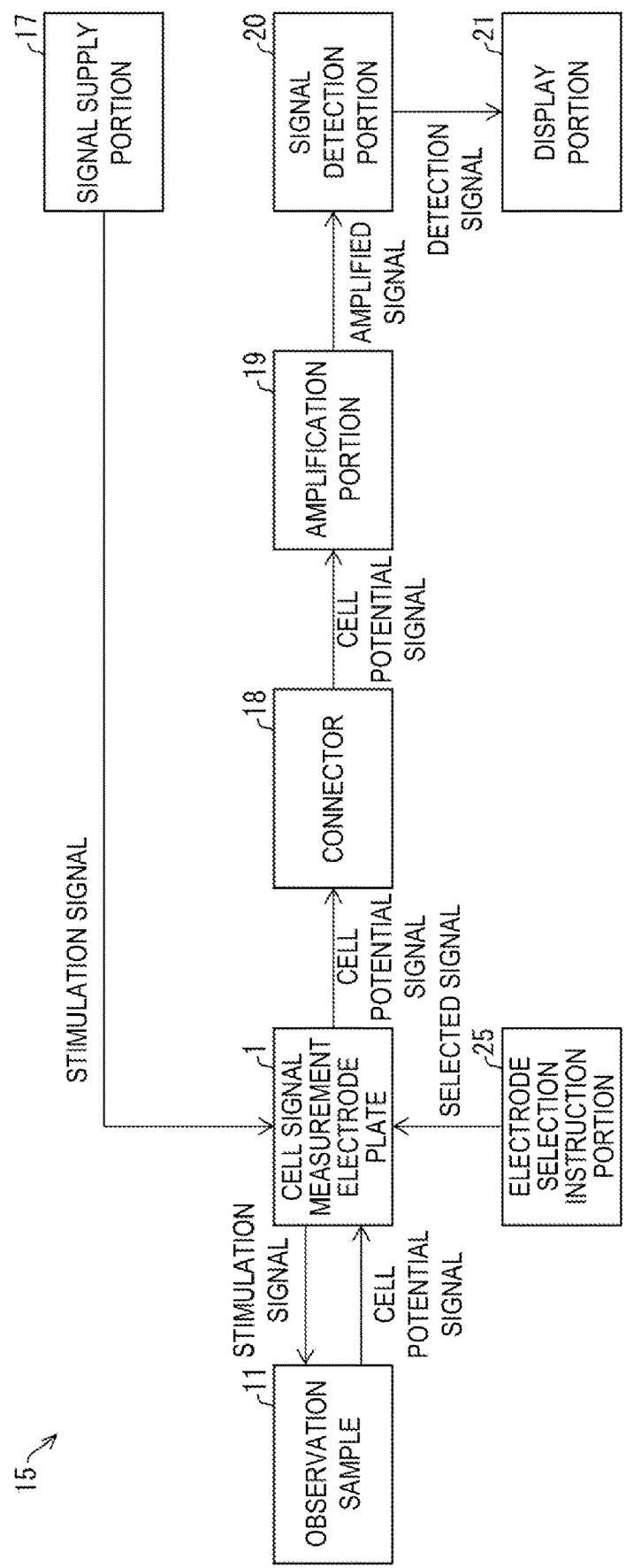
FIG. 1 is a diagram of a functional configuration of a cell signal detection system according to a first embodiment.

FIG. 1 is a diagram of a functional configuration of a cell signal detection system 15 (information processing device) according to a first embodiment. The cell signal detection system 15 includes a cell signal measurement electrode plate 1, a connector 18, an amplification portion 19, a signal detection portion 20, a signal supply portion 17, an electrode selection instruction portion 25, and a display portion 21.

A brain slice or neural cells of a mouse are used as an observation sample 11, for example.

The cell signal measurement electrode plate 1 is a plate that detects a cell potential signal (cell signal) emitted from the observation sample 11.

The electrode selection instruction portion 25 transmits a selected signal to the cell signal measurement electrode plate 1.

The connector 18 is a connection terminal connecting the cell signal measurement electrode plate 1 and the amplification portion 19. The cell potential signal detected by the cell signal measurement electrode plate 1 is transmitted to the amplification portion 19 via the connector 18.

The signal supply portion 17 supplies a stimulation signal to the observation sample 11 via the cell signal measurement electrode plate 1.

The amplification portion 19 amplifies the cell potential signal transmitted via the connector 18. The cell potential signal is amplified to obtain an amplified signal, and the amplified signal is transmitted to the signal detection portion 20.

The signal detection portion 20 converts the amplified signal into a detection signal. For example, the amplified signal changes with time, and thus, based on a temporal change of the amplified signal, the amplified signal is processed in a two-dimensional process focusing on the strength and the time of the amplified signal, to convert the amplified signal into the detection signal.

The display portion 21 displays the detection signal.

Here, a method of using the cell signal detection system 15 will be described.

The observation sample 11 is placed on the cell signal measurement electrode plate 1. Next, the electrode selection instruction portion 25 is used to select and determine which location of the observation sample 11 is to be observed. A stimulation signal is supplied from the signal supply portion 17 to the location selected by the electrode selection instruction portion 25, via the cell signal measurement electrode plate 1. When the stimulation signal is supplied to a selected location of the observation sample 11, the selected location reacts to the stimulation signal, and a cell potential signal is emitted from another location other than the location to which the stimulation signal is supplied. The cell potential signal is transmitted from the location selected by the electrode selection instruction portion 25 to the connector 18 via the cell signal measurement electrode plate 1. The connector 18 transmits the cell potential signal to the amplification portion 19, and the amplification portion 19 amplifies the transmitted signal to convert the transmitted signal into an amplified signal. The amplified signal is transmitted to the signal detection portion 20. The signal detection portion 20 converts the amplified signal into the detection signal. The display portion 21 displays the detection signal.

Thus, the cell signal detection system 15 can supply the stimulation signal from the signal supply portion 17 to the observation sample 11, and measure and display the cell potential signal of the observation sample 11 reacting to the stimulation signal.

Furthermore, even without supplying the stimulation signal to the observation sample 11, the cell signal detection system 15 can detect a cell potential signal that is spontaneously emitted by the observation sample 11. This is because, if the observation sample 11 is immersed into a culture solution, it is assumed that the observation sample 11 spontaneously emits a cell potential signal.

Outer Appearance of Cell Signal Measurement Electrode Plate 1

Figure 2:
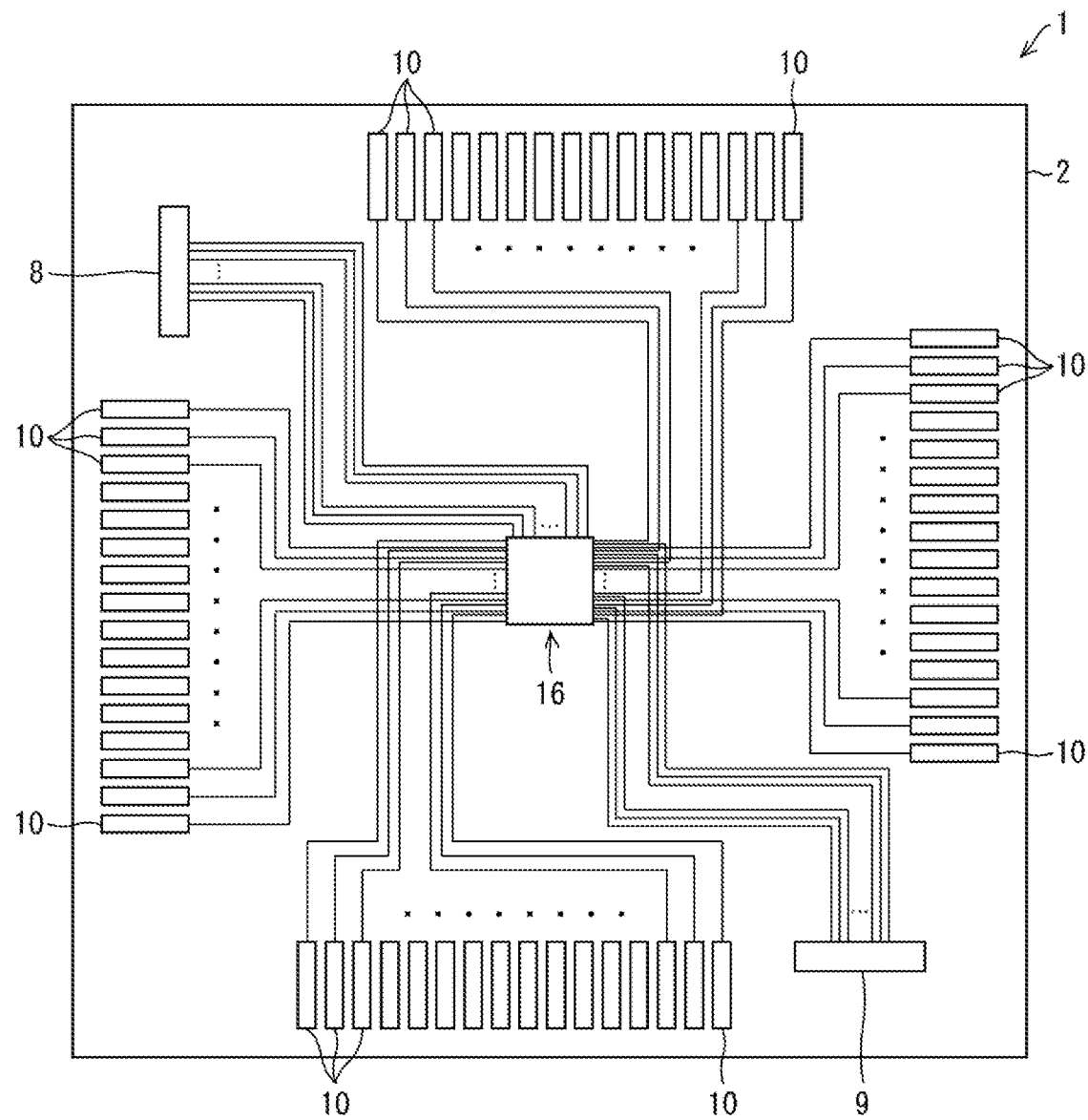
FIG. 2 is a plan view of a cell signal measurement electrode plate provided in the cell signal detection system.

FIG. 2 is a plan view of the cell signal measurement electrode plate 1 provided in the cell signal detection system 15 according to the first embodiment. The cell signal measurement electrode plate 1 includes a substrate 2, a plurality of terminals 10, a gate driver 8 (column selection driver), a source driver 9 (row selection driver), and a microelectrode array 16 (MEA). The plurality of terminals 10, the gate driver 8, the source driver 9, and the microelectrode array 16 are arranged on the substrate 2. The substrate 2 is a flat plate for arranging the terminals 10, the gate driver 8, the source driver 9, and the microelectrode array 16.

In the first embodiment, a transparent substrate is used as the substrate 2. By using a transparent substrate as the substrate 2, the observation sample 11 can be visually recognized from a back side of the substrate 2 by an inverted microscope or the like, and thus, an observer can place the observation sample 11 at a selected specific position of the substrate 2. For example, the transparent substrate is a glass substrate.

In the first embodiment, a glass substrate being a transparent substrate is used as the flat plate of the substrate 2, but the substrate 2 is not limited thereto, and may be a transparent resin substrate. Furthermore, even though an effect by which the observation sample 11 can be visually recognized from the back side of the substrate 2 is not achieved, the flat plate of the substrate 2 may be an Si substrate or a GaAs substrate, which are formed of semiconductor materials that are not transparent.

The microelectrode array 16 supplies the stimulation signal to the observation sample 11 and detects the cell potential signal of the observation sample 11.

Each of the terminals 10 is a terminal that supplies the stimulation signal to the observation sample 11 and detects the cell potential signal. The terminal 10 is connected to the connector 18. In the first embodiment, the cell signal measurement electrode plate 1 includes 64 of the terminals 10. One or more of the 64 terminals 10 is used to supply the stimulation signal. The number of terminals 10 is 64, but the number is not limited thereto and may be larger or smaller.

The gate driver 8 transmits a clock signal to the microelectrode array 16. In the first embodiment, the gate driver 8 is implemented in a flexible printed circuit (FPC) on the cell signal measurement electrode plate 1, and is connected to an external control system including the signal supply portion 17 and the electrode selection instruction portion 25.

The source driver 9 transmits another clock signal to the microelectrode array 16. In the first embodiment, the source driver 9 is implemented in an FPC on the cell signal measurement electrode plate 1, and is connected to an external control system including the signal supply portion 17 and the electrode selection instruction portion 25.

Note that the gate driver 8 may not be arranged on the cell signal measurement electrode plate 1, but the gate driver 8 may be placed on the outside to connect the gate driver 8 as an external gate driver to the cell signal measurement electrode plate 1 via a connector. Furthermore, the gate driver 8 may not be arranged on the cell signal measurement electrode plate 1, but a control system including the external gate driver 8 may be connected to the cell signal measurement electrode plate 1 via a flat cable or a flexible flat cable (FFC).

The source driver 9 may not be arranged on the cell signal measurement electrode plate 1, but the source driver 9 may be placed on the outside to connect the source driver 9 as an external source driver to the cell signal measurement electrode plate 1 via a connector. Furthermore, the source driver 9 may not be arranged on the cell signal measurement electrode plate 1, but a control system including the source driver 9 being an external source driver may be connected to the cell signal measurement electrode plate 1 via a flat cable or an FFC.

Moreover, the gate driver 8 and the source driver 9 may be implemented as COGs on the cell signal measurement electrode plate 1, and may be connected to an external device via an FFC (FPC wiring line) or a connector.

The signal supply portion 17 supplies the stimulation signal to the observation sample 11 via the cell signal measurement electrode plate 1. In the first embodiment, two of the 64 terminals 10 can be assigned for supplying the stimulation signal. The cell signal measurement electrode plate 1 detects a cell potential signal from a site of the observation sample 11 other than a site affected by the stimulation signal among sites of the observation sample 11 receiving the stimulation signal. In the first embodiment, the cell potential signal is detected by the remaining 62 terminals 10 that are not assigned for supplying the stimulation signal.

In a case where a cell potential signal being an autonomous signal of the observation sample 11 is detected, the signal supply portion 17 does not supply the stimulation signal. In this case, the cell potential signal can be detected by all 64 terminals 10. For example, when a myocardial cell is cultivated on the cell signal measurement electrode plate 1, the myocardial cell emits a cell potential signal that is an autonomous signal, and thus, the cell potential signal can be used for reading all terminals 10 without using a stimulation signal.

The observation sample 11 includes brain cells, neural cells, myocardial cells, iPS cells (induced pluripotent stem cells), and other cells relating to organisms.

Microelectrode Array 16 on Cell Signal Measurement Electrode Plate 1

Figure 3:
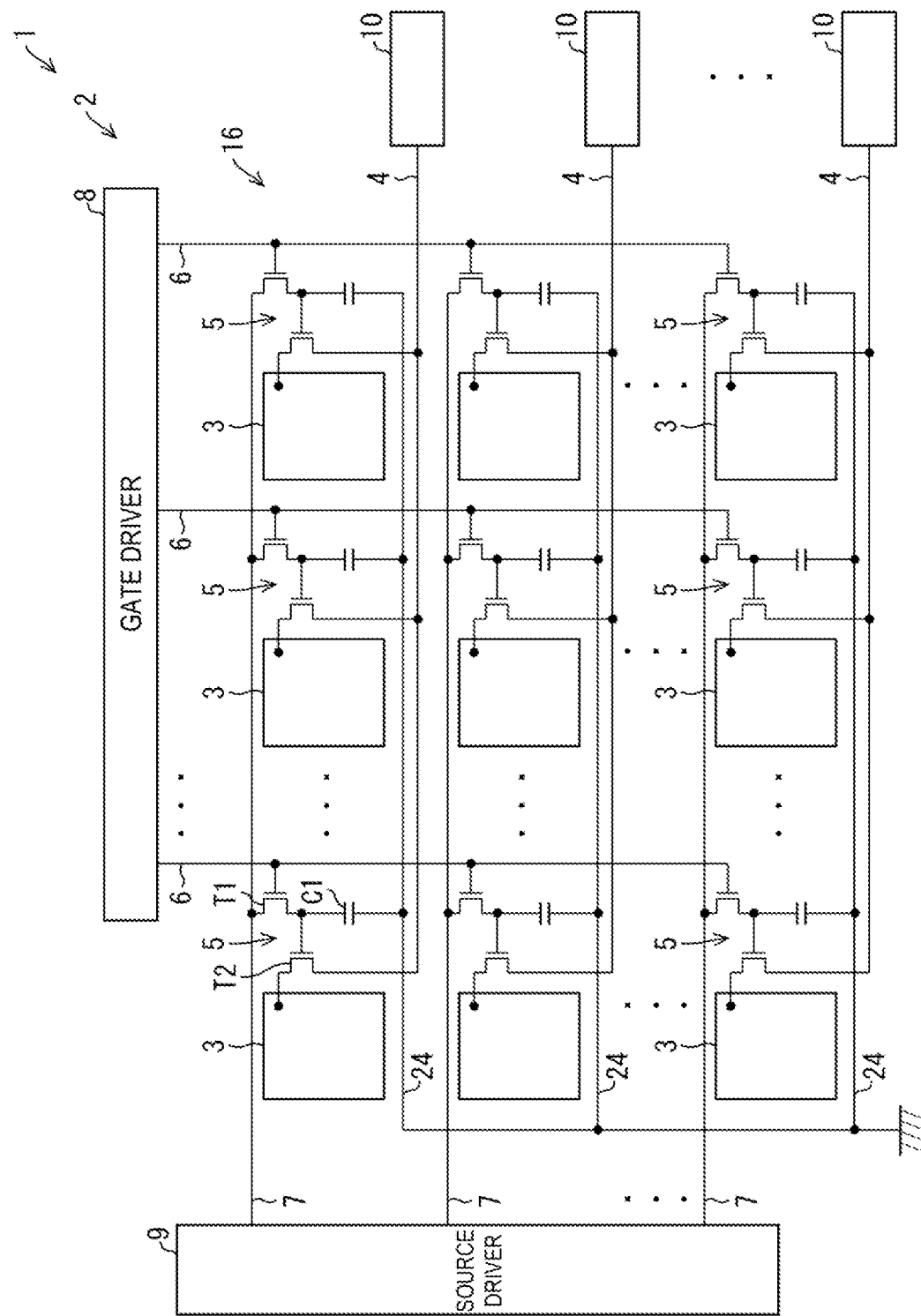
FIG. 3 is a circuit diagram of a microelectrode array and a peripheral portion of the cell signal measurement electrode plate.

FIG. 3 is a simplified circuit diagram of the microelectrode array 16 and a peripheral portion of the cell signal measurement electrode plate 1 according to the first embodiment.

The microelectrode array 16 includes a plurality of first selection lines 6 provided on the substrate 2 and extending in a column direction, a plurality of second selection lines 7 provided on the substrate 2 and extending in a row direction, a plurality of selection circuits 5 and a plurality of electrodes 3 provided on the substrate 2 to read the cell potential signal (cell signal) emitted from the cells of the observation sample 11 and arranged in a matrix shape in a portion where the plurality of first selection lines 6 and the plurality of second selection lines 7 intersect each other, and a plurality of common wiring lines 4 arranged in parallel with the second selection lines 7 to read the cell potential signal and each connected via the selection circuits 5 to one row of the plurality of electrodes 3 arranged in the matrix shape.

The selection circuits 5 each include one or more unit selection circuits. The unit selection circuit includes a first transistor T1, a second transistor T2, and a first capacitor C1 (capacitance element). A gate terminal of the first transistor T1 is connected to a corresponding one of the first selection lines 6 and a source terminal of the first transistor T1 is connected to a corresponding one of the second selection lines 7. A gate terminal of the second transistor T2 is connected to a drain terminal of the first transistor T1, a source terminal of the second transistor T2 is connected to a corresponding one of the electrodes 3, and a drain terminal of the second transistor T2 is connected to a corresponding one of the common wiring lines 4. One capacitance electrode of the first capacitor C1 is connected to the drain terminal of the first transistor T1 and the other capacitance electrode of the first capacitor C1 is connected to a capacitance element potential fixing wiring line 24 (a wiring line) for fixing a constant potential.

The microelectrode array 16 includes several thousands of the electrodes 3 arranged in a matrix shape. In the first embodiment, the microelectrode array 16 includes 4096 of the electrodes 3, that is, 64 horizontal electrodes×64 vertical electrodes=4096 electrodes. The microelectrode array 16 has an area of 25 mm$^2$, that is, 5 mm horizontally×5 mm vertically=25 mm$^2$, and the 4096 electrodes 3 are arranged in this region. The area being 5 mm horizontally×5 mm vertically=25 mm$^2$ that is a range of the region occupied by the electrodes 3 of the microelectrode array 16 is a measurement region where the cell potential signal of the observation sample 11 can be measured.

Each of the electrodes 3 forms a square being 50 μm in the horizontal direction and 50 μm in the vertical direction, for example. A pitch between the electrodes 3 arranged in the microelectrode array 16 is 100 μm, for example.

In the cell signal measurement electrode plate of the known cell signal detection system described in PTL 1, 64 electrodes, that is, 8 horizontal electrodes×8 vertical electrodes=64 electrodes, are arranged in a matrix shape in a measurement region having the same area as the measurement region of the cell signal measurement electrode plate 1 of the first embodiment (5 mm horizontally×5 mm vertically). In such a known cell signal detection system, the number of electrodes is only 64, and thus, it is difficult to arrange the electrodes 3 at a desired measurement position of the observation sample 11.

Since the cell signal measurement electrode plate 1 of the first embodiment includes a total of 4096 of the electrodes 3, the electrodes can be precisely assigned to the observation sample 11 in the measurement region. Therefore, the stimulation signal can be precisely supplied from the signal supply portion 17 to positions of the observation sample 11 to detect the cell potential signal.

In the first embodiment, the microelectrode array 16 includes 4096 of the electrodes 3, that is, 64 horizontal electrodes×64 vertical electrodes=4096 electrodes, but this is not limiting, and the number of electrodes in the horizontal rows and the vertical columns of the microelectrode array 16 may be larger or smaller. In the first embodiment, the size of the electrodes 3 is 50 μm in the horizontal direction, and 50 μm in the vertical direction, but the size is not limited thereto, and the size may be bigger or smaller. In the first embodiment, the area of the measurement region of the microelectrode array 16 is 5 mm horizontally×5 mm vertically=25 mm$^2$, but the area is not limited thereto, and the area may be larger or smaller.

Details of the configuration of the microelectrode array 16 are described in FIG. 3. In FIG. 3, for convenience of description, the electrodes 3 are illustrated in a reduced number.

The gate driver 8 is connected to the plurality of first selection lines 6 corresponding to the electrodes 3 in the vertical columns of the microelectrode array 16. Each of the first selection lines 6 is connected to one corresponding column of the electrodes 3 via the selection circuits 5. The gate driver 8 transmits, to each selection circuit 5, a clock signal for selecting one vertical column of the electrodes 3, based on the selected signal from the electrode selection instruction portion 25.

The source driver 9 is connected to the plurality of second selection lines 7 corresponding to the electrodes 3 in the horizontal rows of the microelectrode array 16. Each of the second selection lines 7 is connected to one corresponding row of the electrodes 3 via the selection circuits 5. Based on the selected signal mentioned above, the source driver 9 transmits, to each of the selection circuits 5, a clock signal for selecting one horizontal row of the electrodes 3.

Each of the selection circuits 5 includes at least one or more unit selection circuits that are each formed by a unit selection circuit provided with two transistors and one capacitor. In the first embodiment, the selection circuit 5 including one unit selection circuit will be described in detail.

Each of the first selection lines 6 is connected to corresponding ones of the electrodes 3 via the selection circuits 5. The first selection line 6 is connected to the gates of corresponding ones of the first transistors T1.

The source of the first transistor T1 is connected to the second selection line 7, and the drain of the first transistor T1 is connected to the first capacitor C1 (capacitance element) and the gate of the second transistor T2.

One of the capacitance electrodes of the first capacitor C1 (capacitance element) is connected to the drain of the first transistor T1, and the other of the capacitance electrodes is connected to the capacitance element potential fixing wiring line 24 (wiring line). In the first embodiment, the capacitance element potential fixing wiring line 24 is grounded.

The source of the second transistor T2 is connected to a corresponding one of the electrodes 3, and the gate of the second transistor T2 is connected to the drain of the first transistor T1 and the first capacitor C1 (capacitance element). The drain of the second transistor T2 is connected to the common wiring line 4.

In the first embodiment, thin film transistors (TFTs) are used as the first and second transistors T1 and T2. In the first embodiment, the TFTs are used as the first and second transistors T1 and T2, but this is not limiting.

Figure 4:
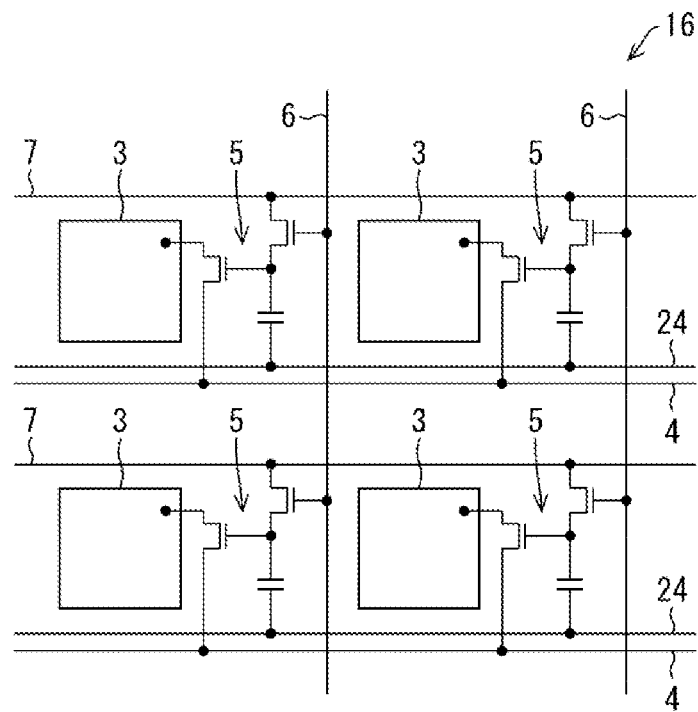
FIG. 4 is a circuit diagram of a microelectrode array in which a common wiring line is arranged in parallel with a second selection line.

FIG. 4 illustrates a circuit diagram of the microelectrode array 16 in which the common wiring lines 4 are arranged in parallel with the second selection lines 7. The common wiring lines 4 are arranged in parallel with the second selection lines 7.

Figure 5:
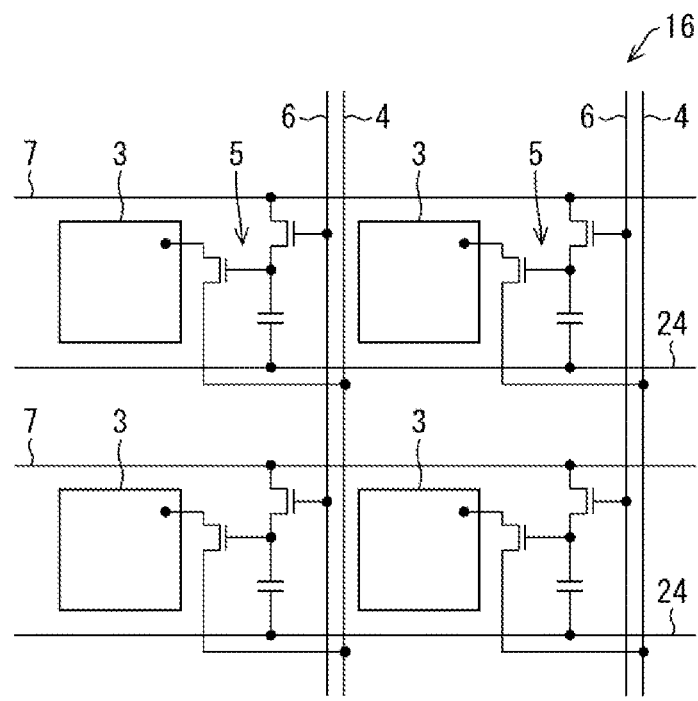
FIG. 5 is a circuit diagram of a microelectrode array in which a common wiring line is arranged in parallel with a first selection line.

FIG. 5 illustrates a circuit diagram of the microelectrode array 16 in which the common wiring lines 4 are arranged in parallel with the first selection lines 6. The common wiring lines 4 are arranged in parallel with the first selection lines 6.

As illustrated in FIG. 4 and FIG. 5, the common wiring lines 4 may be arranged in parallel with the first selection lines 6, or may be arranged in parallel with the second selection lines 7.

Circuit Operation of Cell Signal Measurement Electrode Plate 1

An operation principle of the selection circuits 5 will be described in detail with reference to FIGS. 6, 7, and 8.

Figure 6:
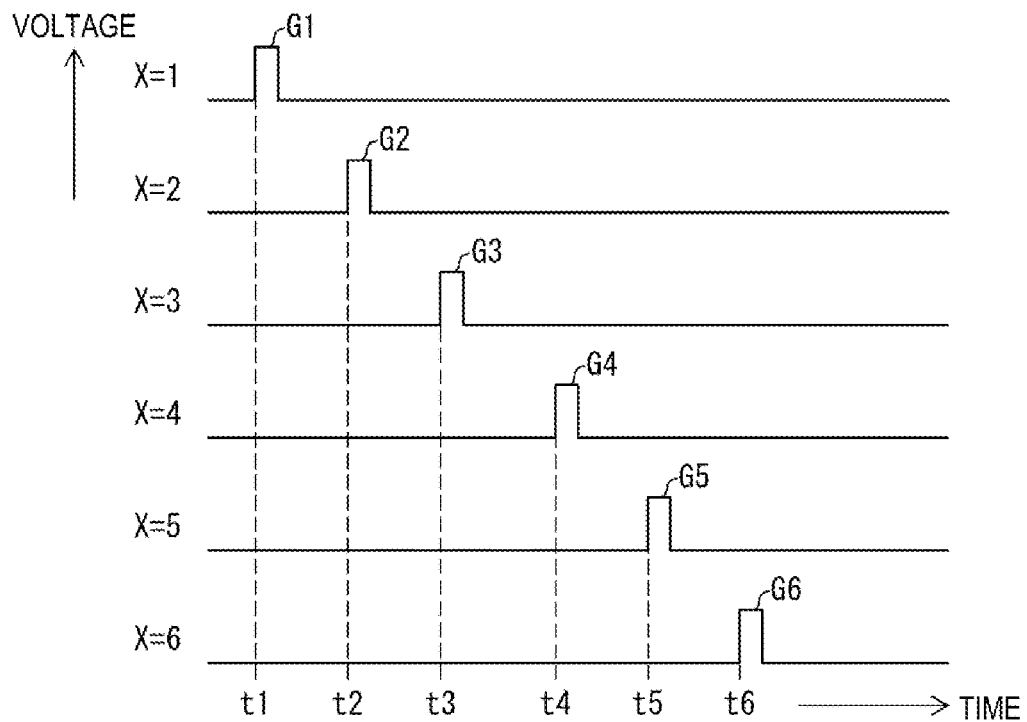
FIG. 6 is an example of a waveform graph showing timings of clock signals supplied to the microelectrode array from a gate driver provided in the cell signal measurement electrode plate.

FIG. 6 is a waveform graph showing timings of clock signals G1 to G6 supplied to the microelectrode array 16 from the gate driver 8 provided in the cell signal measurement electrode plate 1. In the first embodiment, 64 of the first selection lines 6 are provided. However, for the sake of simplicity of explanation, six of the first selection lines 6 will be used for describing the features.

Figure 7:
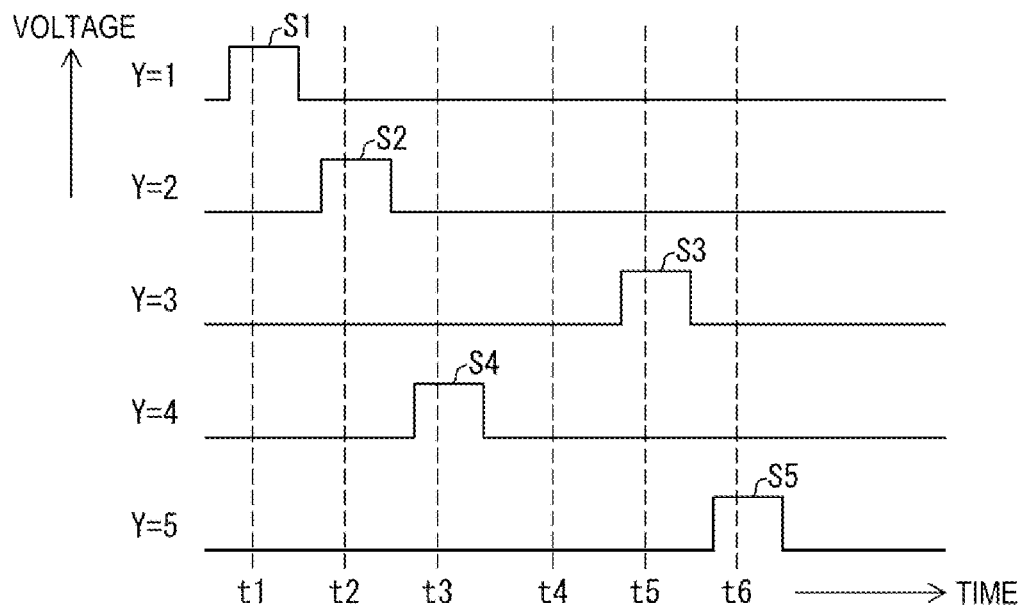
FIG. 7 is an example of a waveform graph showing timings of clock signals supplied to the microelectrode array from a source driver provided in the cell signal measurement electrode plate.

FIG. 7 is a waveform graph showing timings of clock signals S1 to S5 supplied to the microelectrode array 16 from the source driver 9 provided in the cell signal measurement electrode plate 1. In the first embodiment, 64 of the second selection lines 7 are provided. However, for the sake of simplicity of explanation, five of the second selection lines 7 will be used to describe the features.

Figure 8:
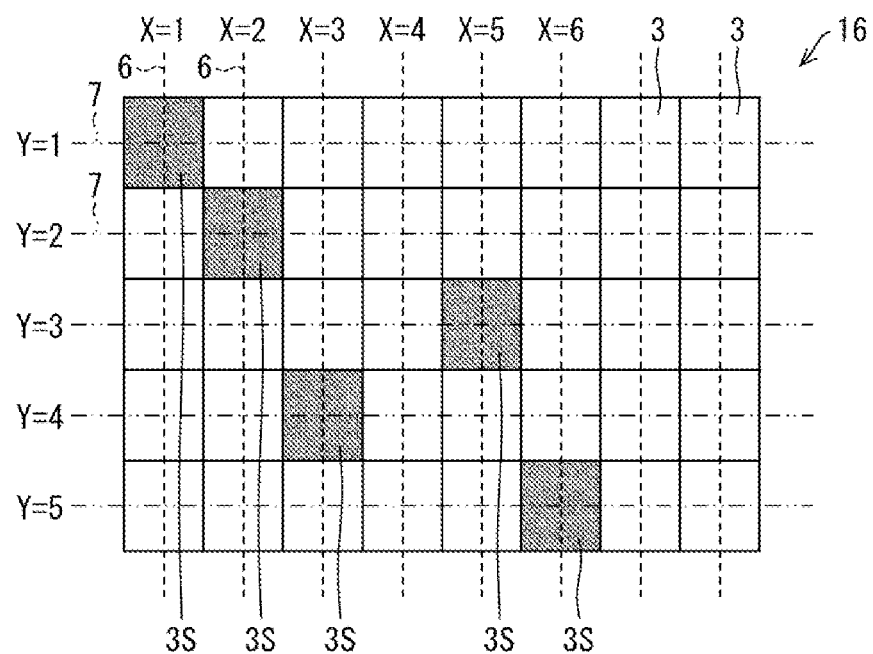
FIG. 8 is a diagram illustrating selected electrodes selected by the clock signals from among a plurality of electrodes arranged in a matrix shape in the microelectrode array.

FIG. 8 is a diagram illustrating selected electrodes 3S selected by the clock signal from among the plurality of electrodes 3 arranged in the matrix shape in the microelectrode array 16. In the first embodiment, 4096 of the electrodes 3 are arranged in the microelectrode array 16. However, for the sake of simplicity of explanation, a case where a total of 40 of the electrodes 3 arranged in five horizontal rows and eight vertical columns are provided will be assumed and described.

In FIG. 8, squares of the matrix shape represent the electrodes 3. In FIG. 8, dashed lines corresponding to X=1 to 6 represent the first selection lines 6. In FIG. 8, dashed lines corresponding to Y=1 to 5 represent the second selection lines 7.

In FIG. 6, the clock signals G1 to G6 are applied to corresponding ones of the six first selection lines 6 indicated by X=1 to 6.

In FIG. 8, X=1 indicates a first column of the first selection lines 6. X=2 indicates a second column of the first selection lines 6 arranged next to the first column of the first selection lines 6. X=3 indicates a third column of the first selection lines 6 arranged next to the second column of the first selection lines 6. Similarly, X=4 indicates a fourth column of the first selection lines 6, X=5 indicates a fifth column of the first selection lines 6, and X=6 indicates a sixth column of the first selection lines 6.

In the time chart of FIG. 6, the vertical axis indicates the magnitude of the voltage, and the horizontal axis indicates the time. The clock signal G1 is applied to the first column of the first selection lines 6 at a time t1, and then, after some time elapses, the clock signal G2 is applied to the second column of the first selection lines 6 at a time t2. Thus, the clock signals G1 to G6 are applied sequentially from the first column to the sixth column of the first selection lines 6.

In the first embodiment, a voltage value of the clock signals G1 to G6 is Hi: 10 V, and a voltage value in a state where the clock signals G1 to G6 are not applied is Lo: −5 V.

In FIG. 7, the clock signals S1 to S5 are applied to corresponding ones of the five second selection lines 7 indicated by Y=1 to 5.

In FIG. 8, Y=1 indicates a first row of the second selection lines 7. Y=2 indicates a second row of the second selection lines 7 arranged next to the first row of the second selection lines 7. Y=3 indicates a third row of the second selection lines 7 arranged next to the second row of the second selection lines 7. Similarly, Y=4 indicates a fourth row of the second selection lines 7, and Y=5 indicates a fifth row of the second selection lines 7.

In the time chart of FIG. 7, the vertical axis indicates the magnitude of the voltage, and the horizontal axis indicates the time. The clock signal S1 is applied to the first row of the second selection lines 7, and then, the clock signal S2 is applied to the second row of the second selection lines 7. Subsequently, the clock signal S4 is applied to the fourth row of the second selection lines 7 and after a certain time elapses, the clock signal S3 is applied to the third row of the second selection lines 7. Finally, the clock signal S5 is applied to the fifth row of the second selection lines 7.

The clock signals G1 to G6 of the first selection lines 6 of FIG. 6 and the clock signals S1 to S5 of the second selection lines 7 in FIG. 7 are synchronized.

At the time t1, the clock signal G1 of the first selection line 6 indicated by X=1 and the clock signal S1 of the second selection line 7 indicated by Y=1 are simultaneously applied to the selection circuits 5. In FIG. 8, black squares indicate that the clock signal is applied to the first selection line 6 and the second selection line 7 at the time t1. A black square in which the first selection line 6 indicated by X=1 to which the clock signal G1 is applied and the second selection line 7 indicated by Y=1 to which the clock signal S1 is applied intersect each other at the time t1 represents one of the selected electrodes 3S.

The selected electrodes 3S are the electrodes 3 for supplying the stimulation signal or detecting the cell potential signal.

At the time t2, the clock signal G2 of the first selection line 6 indicated by X=2 and the clock signal S2 of the second selection line 7 indicated by Y=2 are simultaneously applied to the selection circuits 5. In FIG. 8, a black square in which the first selection line 6 indicated by X=2 to which the clock signal G2 is applied and the second selection line 7 indicated by Y=2 to which the clock signal S2 is applied intersect each other at the time t2, represents one of the selected electrodes 3S.

At a time t3, the clock signal G3 of the first selection line 6 indicated by X=3 and the clock signal S4 of the second selection line 7 indicated by Y=4 are simultaneously applied to the selection circuits 5. In FIG. 8, a black square in which the first selection line 6 indicated by X=3 to which the clock signal G3 is applied and the second selection line 7 indicated by Y=4 to which the clock signal S4 is applied intersect each other at the time t3, represents one of the selected electrodes 3S.

At a time t4, the clock signal G4 of the first selection line 6 indicated by X=4 is applied, but no clock signal is applied in any line of the second selection lines 7. In this case, none of the electrodes 3 is selected in FIG. 8.

At a time t5, the clock signal G5 of the first selection line 6 indicated by X=5 and the clock signal S3 of the second selection line 7 indicated by Y=3 are simultaneously applied to the selection circuits 5. In FIG. 8, a black square in which the first selection line 6 indicated by X=5 to which the clock signal G5 is applied and the second selection line 7 indicated by Y=3 to which the clock signal S3 is applied intersect each other at the time t5, represents one of the selected electrodes 3S.

At a time t6, the clock signal G6 of the first selection line 6 indicated by X=6 and the clock signal S5 of the second selection line 7 indicated by Y=5 are simultaneously applied to the selection circuits 5. In FIG. 8, a black square in which the first selection line 6 indicated by X=6 to which the clock signal G6 is applied and the second selection line 7 indicated by Y=5 to which the clock signal S5 is applied intersect each other at the time t5, represents one of the selected electrodes 3S.

Thus, when the clock signal applied to the first selection line 6 and the clock signal applied to the second selection line 7 are simultaneously transmitted to the selection circuits 5, the electrodes 3 connected to the selection circuits 5 are selected.

A circuit operation for selecting the selected electrodes 3S of the microelectrode array 16 will be described with reference to FIG. 3 and FIG. 8.

The clock signal G1 is applied to the gates of the first transistors T1 of the selection circuits 5 arranged in the electrodes 3 of the column indicated by X=1. Simultaneously, the clock signal S1 is applied to the sources of the first transistors T1 of the selection circuits 5 arranged in the electrodes 3 of the second selection line 7 of the row indicated by Y=1.

When the clock signal G1 and the clock signal S1 are simultaneously applied to the gates of the first transistors T1 of the electrodes 3 and the sources of the first transistors T1, respectively, a current flows between the source and the drain of the first transistor T1, and a charge is supplied to the first capacitor C1 (capacitance element).

Next, the clock signal G1 decays to Lo, and the source and the drain of the first transistor T1 are blocked. Subsequently, the clock signal S1 decays to Lo. Thus, the charge supplied to the first capacitor C1 (capacitance element) is maintained without flowing back to the second selection line 7 via the first transistor T1, and a voltage is applied to the gate of the second transistor T2. As a result, the source and the drain of the second transistor T2 connected to a corresponding one of the electrodes 3 are conductive.

Thus, it is possible for a person conducting the measurement to supply, to the selected electrode 3S, the stimulation signal from the common wiring line 4 connected to the drain of the second transistor T2, or to read the cell potential signal of the selected electrode 3S from the common wiring line 4.

Function of Selected Electrodes

Figure 9:
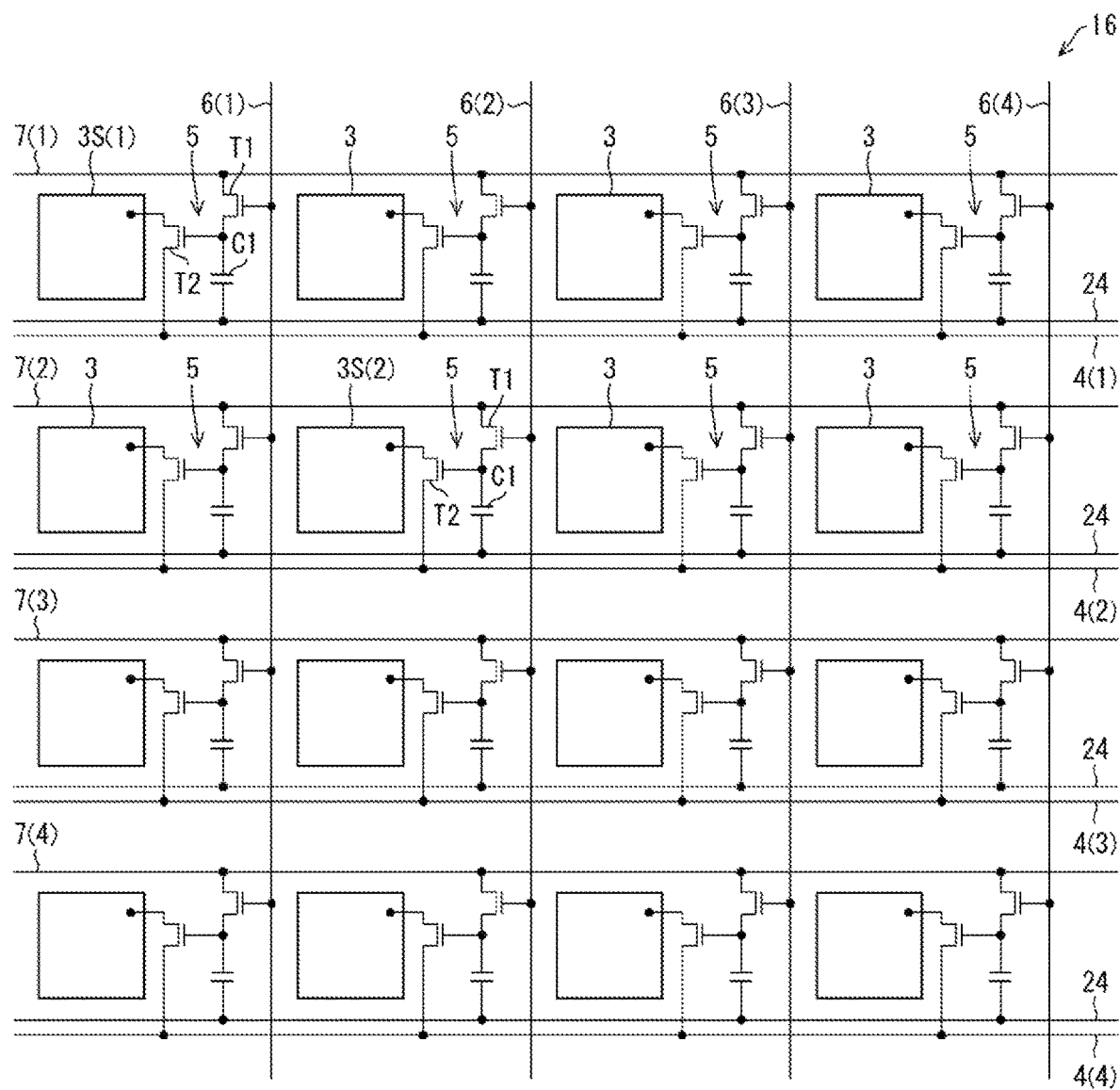
FIG. 9 is a diagram illustrating an arrangement of selected electrodes selected from among a plurality of electrodes arranged in a matrix shape in the microelectrode array.

FIG. 9 is a diagram illustrating an arrangement of selected electrodes 3S (1) and 3S (2) selected from among the plurality of electrodes 3 arranged in a matrix shape in the microelectrode array 16. To simplify the explanation, the arrangement of the electrodes 3 is assumed to be an arrangement of four horizontal rows and four vertical columns.

Here, a structure is described in which the selected electrode 3S (1) supplies a stimulation signal to the observation sample 11, or detects a cell potential signal from the observation sample 11.

A signal by which the clock signal is applied to the first selection lines 6(1) to 6(4) or the second selection lines 7(1) to 7(4) is defined as an Hi signal, and a state where the clock signal is not applied is defined as an Lo state.

In a state where the Hi signal is used in the second selection line 7(1) and the other second selection lines 7(2) to (4) are in the Lo state, if the Hi signal is used in the first selection line 6(1) and the other first selection lines 6(2) to (4) are in the Lo state, the charge of the Hi signal is only supplied to the first capacitor C1 of the selected electrode 3S (1).

Furthermore, in a state where the Hi signal is used in the second selection line 7 (2) and the other second selection lines 7(1), 7(3), and 7(4) are in the Lo state, if the Hi signal is used in the first selection line 6(2) and the other first selection lines 6(1), 6(3), and 6(4) are in the Lo state, the charge is only supplied to the first capacitor C1 of the selected electrode 3S (2).

Thus, the source driver 9 sequentially supplies the Hi signal to the second selection lines 7(1) to (4), based on the selection signal transmitted by the electrode selection instruction portion 25. Based on the selection signal transmitted by the electrode selection instruction portion 25, the gate driver 8 supplies the Hi signal, in synchronization with the Hi signal of the second selection lines 7(1) to (4), to any of the first selection lines 6(1) to (4) corresponding to the selected electrode 3S to be selected. Thus, the charge can be supplied to the first capacitors C1 of the selection circuits 5 connected to the selected electrodes 3S (1) and 3S (2) to be selected. The first capacitors C1 to which the charge is supplied apply a voltage to the gates of the second transistors T2, and thus, conduction between the selected electrodes 3S (1) and 3S (2) and the common wiring line 4 is possible.

Furthermore, since a charge holding period of the first capacitor C1 is limited, the charge needs to be repeatedly supplied at a constant cycle as necessary.

Figure 10:
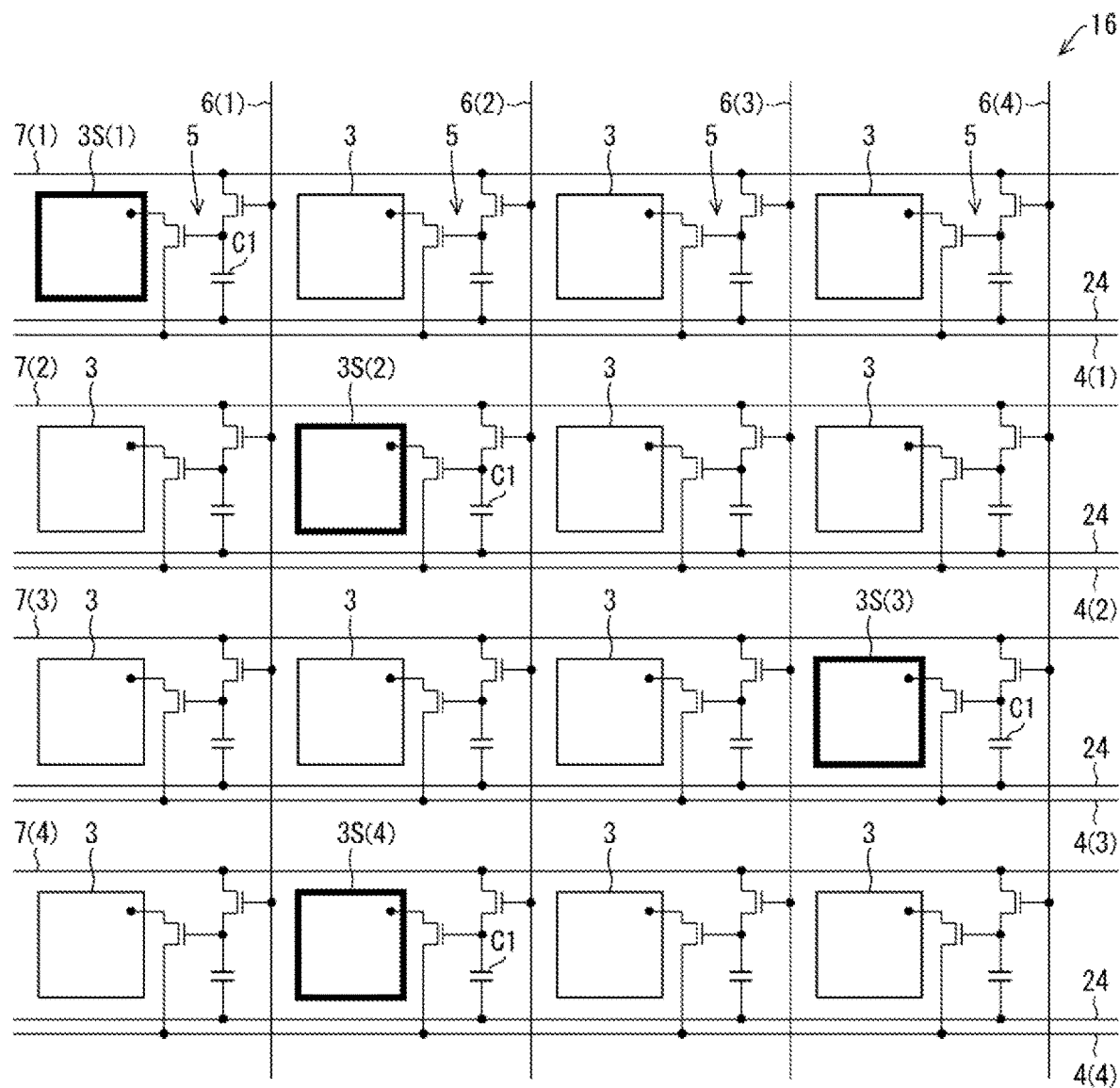
FIG. 10 is a diagram illustrating an arrangement of selected electrodes selected from among a plurality of electrodes arranged in a matrix shape in the microelectrode array.

FIG. 10 is a diagram illustrating an arrangement of selected electrodes 3S (1) to 3S (4) selected from among the plurality of electrodes 3 arranged in a matrix shape in the microelectrode array 16. To simplify the explanation, the arrangement of the electrodes 3 is assumed to be an arrangement of four horizontal rows and four vertical columns.

For example, as illustrated in FIG. 10, when a charge is supplied to the first capacitors C1 of the selected electrodes 3S (1) to 3S (4), if the stimulation signal is supplied to the common wiring line 4(2) from the outside in a state where the observation sample 11 is placed on the cell signal measurement electrode plate 1, the stimulation signal is supplied from the selected electrode 3S (2) to the observation sample 11.

Subsequently, the other common wiring lines 4(1), 4(3), and 4(4) transmit the cell potential signal detected by the selected electrodes 3S (1), 3S (3), and 3S (4) to the cell signal detection system 15.

Thus, by selecting the selected electrodes 3S (1) to 3S (4) from among the electrodes 3 arranged in the microelectrode array 16, it is possible to supply the stimulation signal to a desired measurement position of the observation sample 11 or a position in the vicinity of the desired measurement position, to detect the cell potential signal.

Figure 11:
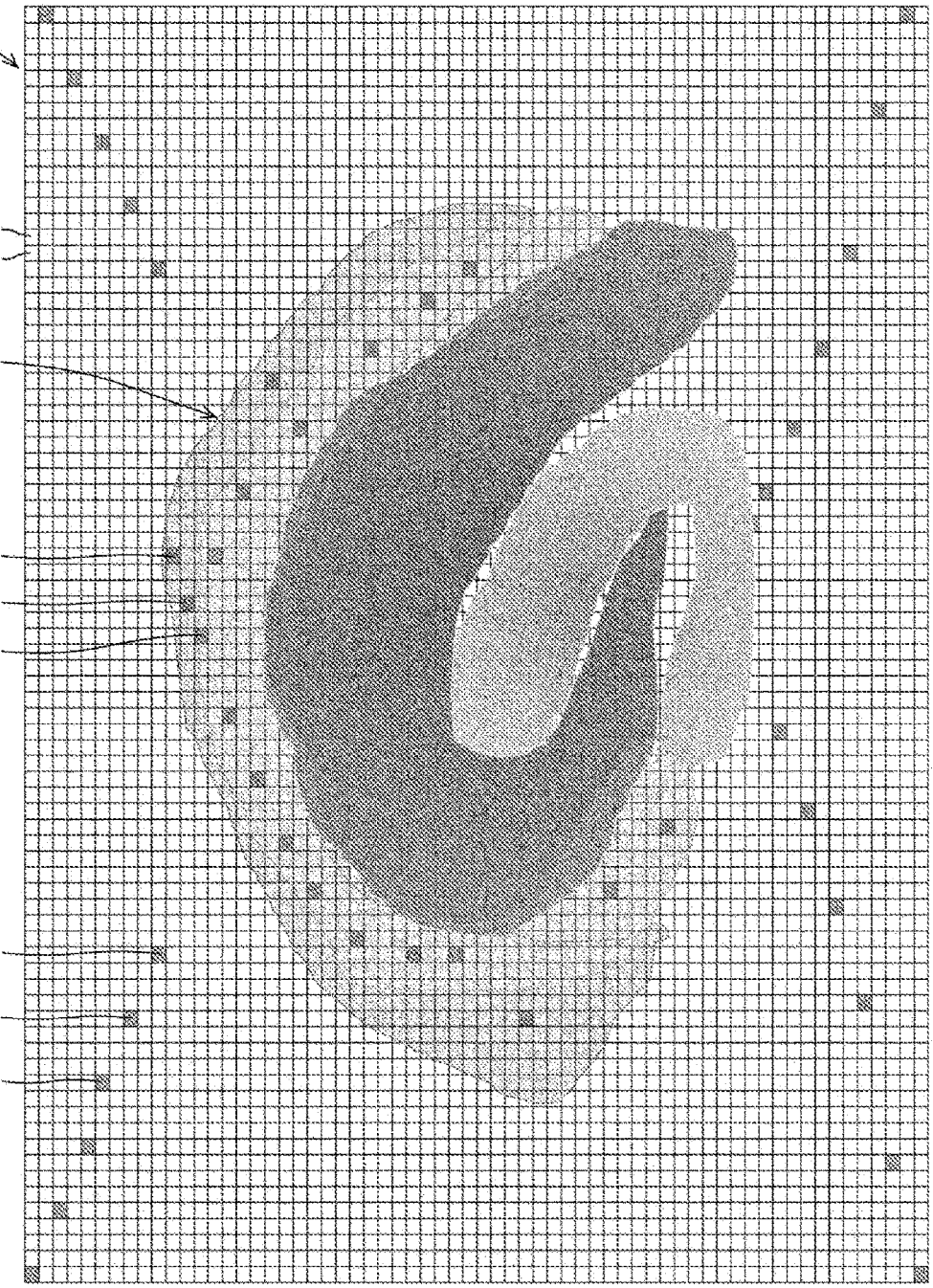
FIG. 11 is a diagram illustrating a positional relationship between the selected electrodes of the cell signal measurement electrode plate and an observation sample.

FIG. 11 is a diagram illustrating a positional relationship between the observation sample 11 and the selected electrodes 3S of the cell signal measurement electrode plate 1 according to the first embodiment.

The electrodes 3 are represented by a grid in a matrix shape. The observation sample 11 is placed in an overlapping manner on the grid of the matrix shape.

In the first embodiment, the cell signal measurement electrode plate 1 is formed of a transparent glass substrate. Therefore, since the observation sample 11 can be visually recognized through the glass substrate by an inverted microscope, it is possible to identify the desired measurement position by the electrode selection instruction portion 25 while viewing the observation sample 11.

In FIG. 11, black squares among the squares of the matrix shape represent the selected electrodes 3S that are selected.

The cell signal measurement electrode plate 1 of the first embodiment has a total of 4096 of the electrodes 3 arranged in 64 rows and 64 columns.

Thus, an observer can select 64 of the selected electrodes 3S from among the 4096 electrodes 3 by the electrode selection instruction portion 25, and align the selected electrodes 3S with a desired measurement position of the observation sample 11 or a position in the vicinity of the desired measurement position.

This makes it possible to measure the cell potential signal of the observation sample 11 at a position corresponding very precisely to the desired measurement.

Thus, the stimulation signal to be given to the cells of the observation sample 11 is supplied from an external circuit, via the common wiring lines 4 connected to the selection circuits 5 selected by the first selection lines 6 and the second selection lines 7, to a part (a second electrode) of the selected electrodes 3S, which are the electrodes 3 connected to the selection circuits 5. Subsequently, the cell potential signal is read from the cells of the observation sample 11 via the common wiring line 4 and the remaining part (a first electrode) of the selected electrodes 3S, which are the electrodes 3 connected to the selection circuits 5 selected by the first selection lines 6 and the second selection lines 7.

Thus, the inventors created the cell signal measurement electrode plate 1 in which several thousands of microelectrodes are formed on a substrate in a range similar to a measurement area of an observation sample in the cell potential measurement electrode of PTL 1 described above. According to the cell signal measurement electrode plate 1, since it is possible to select several tens of microelectrodes that are to be measured from several thousands of microelectrodes, the measurement position of the observation sample can be selected very precisely.

The cell signal measurement electrode plate 1 according to the first embodiment is clearly different from that in PTL 2 in that the cell signal measurement electrode plate 1 has a configuration in which not all electrodes arranged in a matrix shape are read and scanned, as with the cell potential measurement device according to PTL 2, and instead, since a charge is supplied only to the first capacitor C1 of the selection circuit 5 corresponding to the electrode 3 being a specific, selected electrode so that the specific electrode 3 conducts with the common wiring line 4, the cell potential signal is read only from the specific electrode 3 and supplied to an external circuit.

In the cell signal measurement electrode plate 1, since the electrodes 3 being very small electrodes are arranged on the substrate 2 that is made of glass and transparent, the observation sample 11 can be observed from a side of the substrate 2 made of glass, and it is possible to select a position of the observation sample 11 to be measured.

In the cell potential measurement device described in PTL 2 mentioned above, a silicon substrate for using the CMOS integrated circuit technology is opaque. Furthermore, the observation sample is placed on microelectrodes arranged on the opaque silicon substrate, and thus, there is a problem in that it is not possible to observe the observation sample by an inverted microscope or the like from a side of the opaque silicon substrate and know a position of the observation sample to be measured.

In the cell potential measurement device of PTL 2, the speed of the operation of the transistor employing the CMOS integrated circuit technology is fast, and thus, it is possible to select a line at a high speed and to control, for example, the output by a 64-bit CPU or the like, to precisely read all electrodes. The cell potential measurement device operates by using an image of a CMOS image sensor employed in a video camera, instead of selecting an electrode. A high-speed operation is possible, and thus, the cell potential measurement device timely resolves the cell potential signal to sequentially read the cell potential signal of all electrodes, and synthesizes a waveform of the cell potential signal for the coordinates of each electrode to generate the waveform of the cell potential signal.

The silicon substrate of PTL 2 has a high unit cost, and thus, it is necessary to cut out a region portion of the microelectrodes of the silicon substrate and to bond the region portion by a wire to another substrate having lower cost to form a plate. For this reason, there is a problem in that the manufacturing process is complex.

Furthermore, in the silicon substrate, aluminum is used for the electrodes bonded by the wire. However, since aluminum is cytotoxic, it is necessary to provide measures against elution of the aluminum after the wire-bonding, or to increase the size of the silicon substrate to sufficiently separate the aluminum electrode from the microelectrodes. Thus, there is a problem in that the cost of the cell signal measurement electrode plate increases.

On the other hand, the cell signal measurement electrode plate 1 according to the first embodiment includes the transparent substrate 2, and thus, the observation sample 11 can be observed through the substrate 2 from below the substrate 2 by an inverted microscope or the like, and the positions of the electrodes 3 and the position of the observation sample 11 can be accurately determined. The cells of the observation sample 11 are immersed in a culture solution or cerebrospinal fluid to be kept alive. Therefore, since it is not possible to observe the observation sample 11 from above, the transparency of the substrate 2 is effective.

Since transistor that may be formed on the glass substrate is limited by a performance of the semiconductor material that can be formed on the glass, it is not possible to perform an operation at a high speed, such as in a transistor that can be formed on a silicon substrate or a GaAs substrate. Therefore, such as in the cell signal measurement electrode plate 1, the selection circuit 5 that allows for continuous conduction between the selected electrode 3S and the common wiring line 4 is effective. After being selected, the selected electrode 3S is continuously electrically connected to the common wiring line 4, and thus, the detected cell potential signal can be read via the common wiring line 4 by an external device.

Modified Example of First Embodiment

Figure 12:
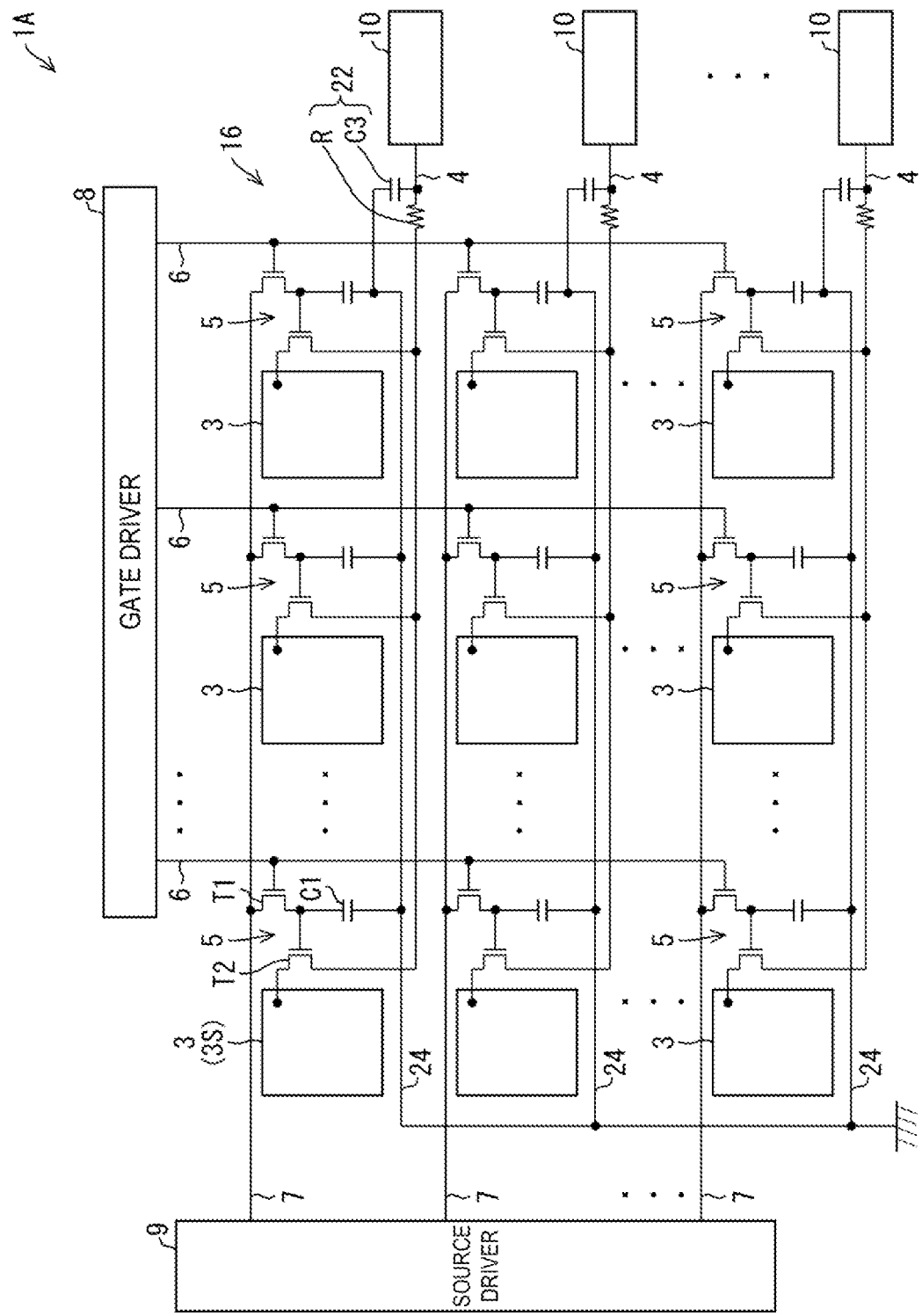
FIG. 12 is a circuit diagram of a cell signal measurement electrode plate according to a modified example of the first embodiment.

FIG. 12 is a circuit diagram of a cell signal measurement electrode plate 1A according to a modified example of the first embodiment.

Since the cell potential signal read by the cell signal measurement electrode plate 1 is a weak signal, measures against noise are necessary. In particular, high-frequency noise needs to be removed, and thus, a low-pass filter 22 (a noise cut filter) is arranged in a region from the drain of the second transistor T2 to the terminal 10 via the common wiring line 4. In the example illustrated in FIG. 12, one of the low-pass filters 22 is provided for each of the common wiring lines 4 on a side of the terminals 10 of the common wiring lines 4. A resistor R is illustrated as the low-pass filter 22. However, a resistance value of the wiring line and the second transistor T2 included in a region from the electrode 3 to the low-pass filter 22 may be used as the resistor R, and the resistor R may actually not be placed in the position in FIG. 12.

The low-pass filter 22 is an RC circuit, for example.

Note that the low-pass filter 22 may be provided for each of selection circuits 5A connected to a corresponding one of the electrodes 3. In this case, one end of the resistor R is connected to the drain of the second transistor T2 of the selection circuit 5A, and the other end of the resistor R is connected to the common wiring line 4 and is also connected to one of the capacitance electrodes of a third capacitor C3. The wiring of the other capacitance electrode of the third capacitor C3 is connected to the capacitance element potential fixing wiring line 24. In the present embodiment, the capacitance element potential fixing wiring line 24 is grounded.

Thus, the high-frequency noise can be removed when the cell potential signal of the selected electrode 3S is read or when the stimulation signal is supplied to the selected electrode 3S.

Second Embodiment

Another embodiment of the disclosure will be described below. Note that, for convenience of description, members having the same functions as those of the members described in the above-described embodiment will be denoted by the same reference numerals and signs, and the description thereof will not be repeated.

Figure 13:
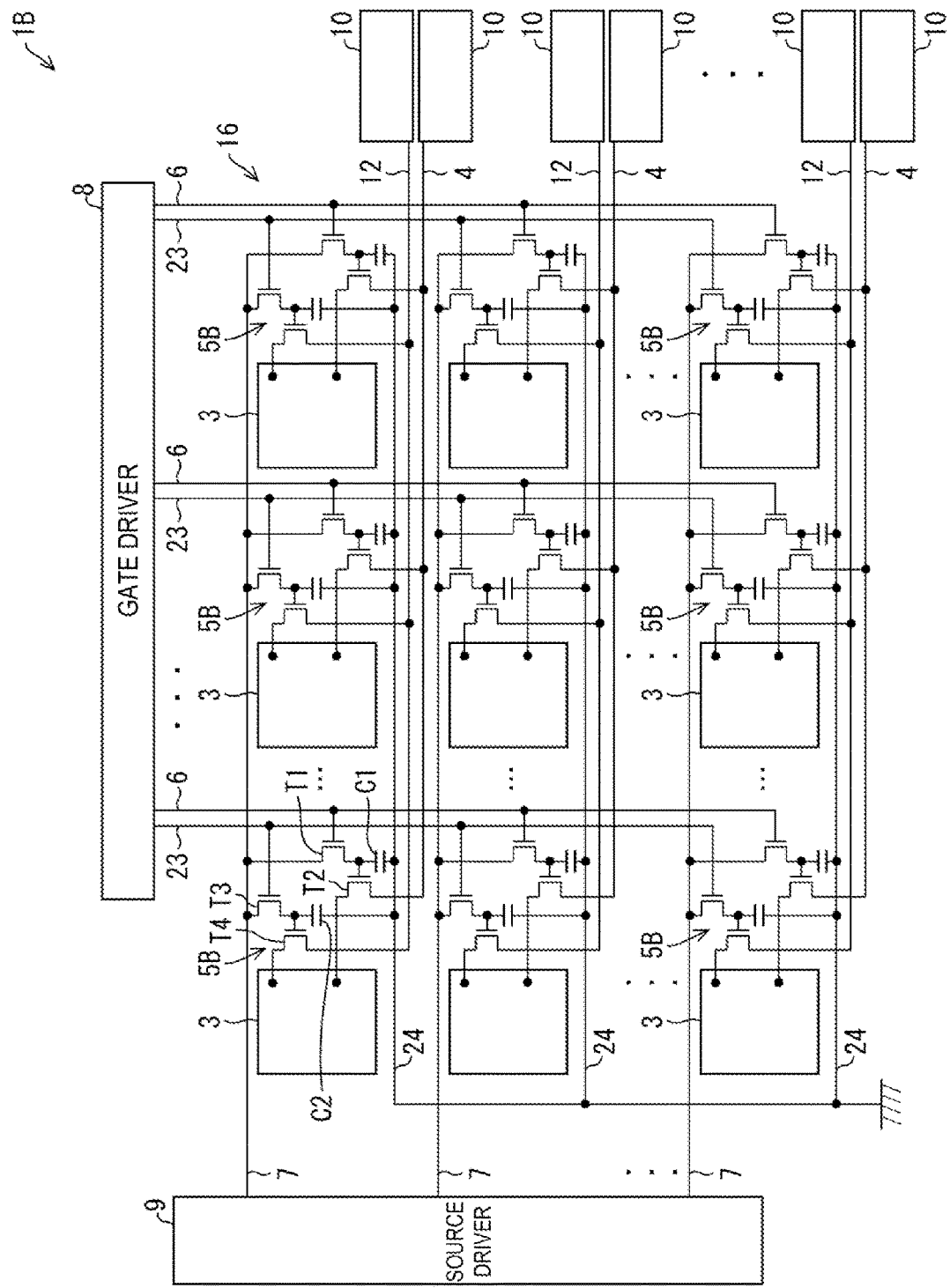
FIG. 13 is a circuit diagram of a cell signal measurement electrode plate according to a second embodiment.

FIG. 13 is a circuit diagram of a cell signal measurement electrode plate 1B according to a second embodiment.

In the second embodiment, selection circuits 5B are connected to the electrodes 3.

The selection circuits 5B each include at least two unit selection circuits. For example, in addition to the unit selection circuit including the first transistor T1, the second transistor T2, and the first capacitor C1, the selection circuits 5B each include another unit selection circuit including a third transistor T3, a fourth transistor T4, and a second capacitor C2.

The gate driver 8 further includes first selection lines 23 that drive a clock signal providing different control from the clock signal of the first selection lines 6.

The electrodes 3 are connected to the common wiring lines 4 and common wiring lines 12 via the selection circuits 5B.

The selection circuits 5B will be described in detail.

The first selection line 6 is connected to the gate of the first transistor T1. The source of the first transistor T1 is connected to the second selection line 7, and the drain of the first transistor T1 is connected to the first capacitor C1 and the gate of the second transistor T2.

One of the capacitance electrodes of the first capacitor C1 is connected to the drain of the first transistor T1, and the wiring of the other of the capacitance electrodes of the first capacitor C1 is connected to the capacitance element potential fixing wiring line 24. In the present embodiment, the capacitance element potential fixing wiring line 24 is grounded.

The source of the second transistor T2 is connected to the electrode 3, and the gate of the second transistor T2 is connected to the drain of the first transistor T1 and the first capacitor C1. The drain of the second transistor T2 is connected to the common wiring line 4.

The first selection line 23 is connected to the gate of the third transistor T3. The source of the third transistor T3 is connected to the second selection line 7, and the drain of the third transistor T3 is connected to the second capacitor C2 and the gate of the fourth transistor T4.

One of the capacitance electrodes of the second capacitor C2 is connected to the drain of the third transistor T3, and the other of the capacitance electrodes of the second capacitor C2 is connected to the capacitance element potential fixing wiring line 24.

The source of the fourth transistor T4 is connected to the electrode 3, and the gate of the fourth transistor T4 is connected to the drain of the third transistor T3 and the second capacitor C2. The drain of the fourth transistor T4 is connected to the common wiring line 12.

Thus, the selection circuits 5B each include a plurality of unit selection circuits. One of the plurality of unit selection circuits is connected to the common wiring line 4, and another one of the plurality of unit selection circuits is connected to the common wiring line 12.

The selection circuits 5B may select two selected electrodes 3S from among the electrodes 3 arranged in the first row of the microelectrode array 16 according to the cell signal measurement electrode plate 1B.

In the first embodiment, only one selected electrode 3S can be selected from among the electrodes 3 connected to the second selection line 7 in the first row of the microelectrode array 16 according to the cell signal measurement electrode plate 1. On the other hand, in the second embodiment, the number of selected electrodes 3S that can be selected from among the electrodes 3 corresponding to the second selection line 7 in the first row is increased to two.

Thus, the observer can further precisely adjust the measurement position of the observation sample 11 when the selected electrodes 3S are aligned with a desired measurement position of the observation sample 11.

With the number of terminals 10 being defined as 64, in the first embodiment, the terminals 10 can select the electrodes 3 in 64 rows in the vertical direction. However, in the present embodiment, since two selected electrodes 3S can be selected in the same row, two terminals can be assigned to the same row. Therefore, the terminals 10 can select the electrodes 3 in 32 rows in the vertical direction, which is half the number of the first embodiment.

In the second embodiment, the selection circuits 5B are connected to two common wiring lines, that is, the common wiring lines 4 and 12. However, without being limited thereto, the selection circuits 5B may have a configuration in which the number of unit selection circuits is three, and another common wiring line is further added. With such a configuration, the number of selected electrodes 3S that can be selected from among the electrodes 3 corresponding to the second selection lines 7 in the first row is three.

The selection circuits 5B may each include several unit selection circuits, limited to a number that can be arranged on the area of the electrodes 3.

Figure 14:
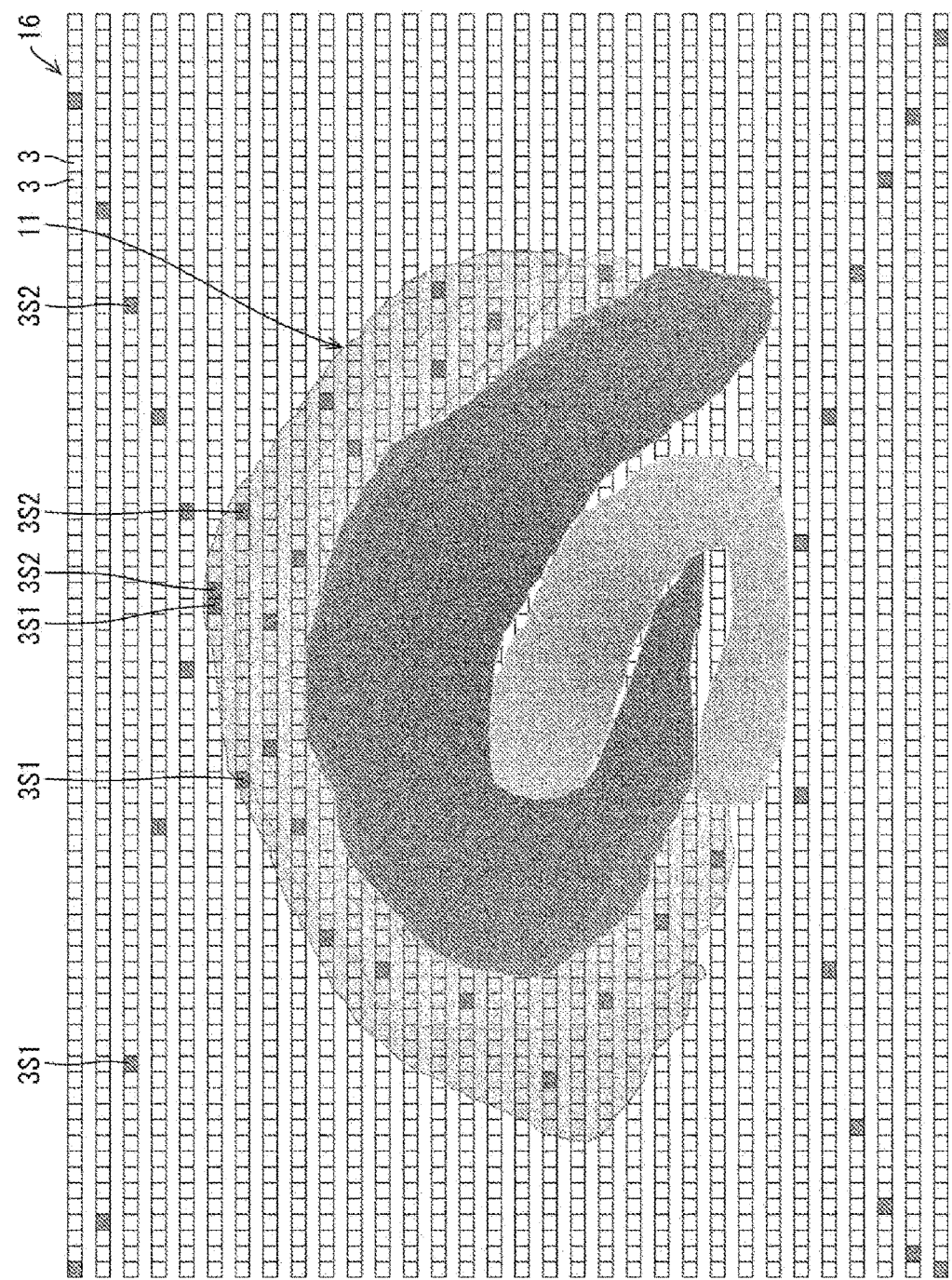
FIG. 14 is a diagram illustrating a positional relationship between selected electrodes of the cell signal measurement electrode plate and the observation sample.

FIG. 14 is a diagram illustrating a positional relationship between the observation sample 11 and selected electrodes 3S1 and 3S2 of the cell signal measurement electrode plate 1B according to the second embodiment.

The electrodes 3 are represented by a grid in a matrix shape of the microelectrode array 16. The observation sample 11 is placed in an overlapping manner on the grid of the matrix shape of the microelectrode array 16.

In FIG. 14, the selected electrodes 3S1 and 3S2 that are selected are represented by locations colored in black in the grid of the matrix shape of the microelectrode array 16. The selected electrodes 3S1 are selected electrodes corresponding to the first selection lines 6. The selected electrodes 3S2 are selected electrodes corresponding to the first selection lines 23.

In FIG. 14, two electrodes, that is, one of the selected electrodes 3S1 and one of the selected electrodes 3S2, are selected in the same row of the grid of the matrix shape of the microelectrode array 16.

Third Embodiment

Another embodiment of the disclosure will be described below. Note that, for convenience of description, members having the same functions as those of the members described in the above-described embodiment will be denoted by the same reference numerals and signs, and the description thereof will not be repeated.

Figure 15:
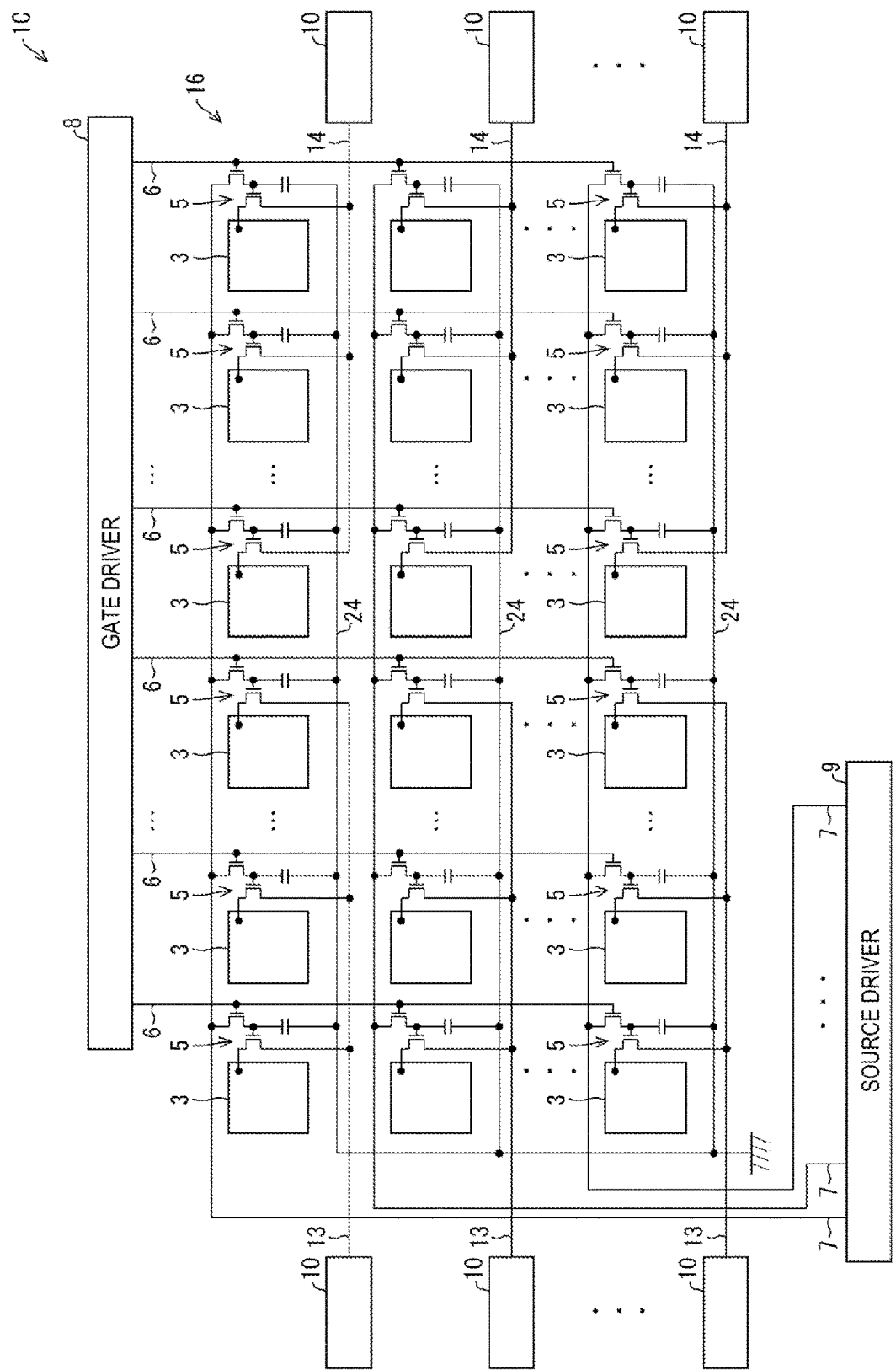
FIG. 15 is a circuit diagram of a cell signal measurement electrode plate according to a third embodiment.

FIG. 15 is a circuit diagram of a cell signal measurement electrode plate 1C according to a third embodiment.

In the third embodiment, the cell signal measurement electrode plate 1C includes first divided lines 13 (first divided common wiring lines) and second divided lines 14 (second divided common wiring lines), instead of the common wiring lines 4.

The first divided lines 13 and the second divided lines 14 divide the electrodes 3 in the matrix shape of the microelectrode array 16 into two identical rows in the horizontal direction.

The cell signal measurement electrode plate 1C may select, with respect to one of the first divided lines 13 and one of the second divided lines 14 of the same row of the microelectrode array 16, one of the selected electrodes 3S1 in the first divided line 13 and may select one of the selected electrodes 3S2 in the second divided line 14.

Thus, the observer can precisely adjust the measurement position of the observation sample 11 when the selected electrodes 3S1 and 3S2 are aligned with a desired measurement position of the observation sample 11.

Figure 16:
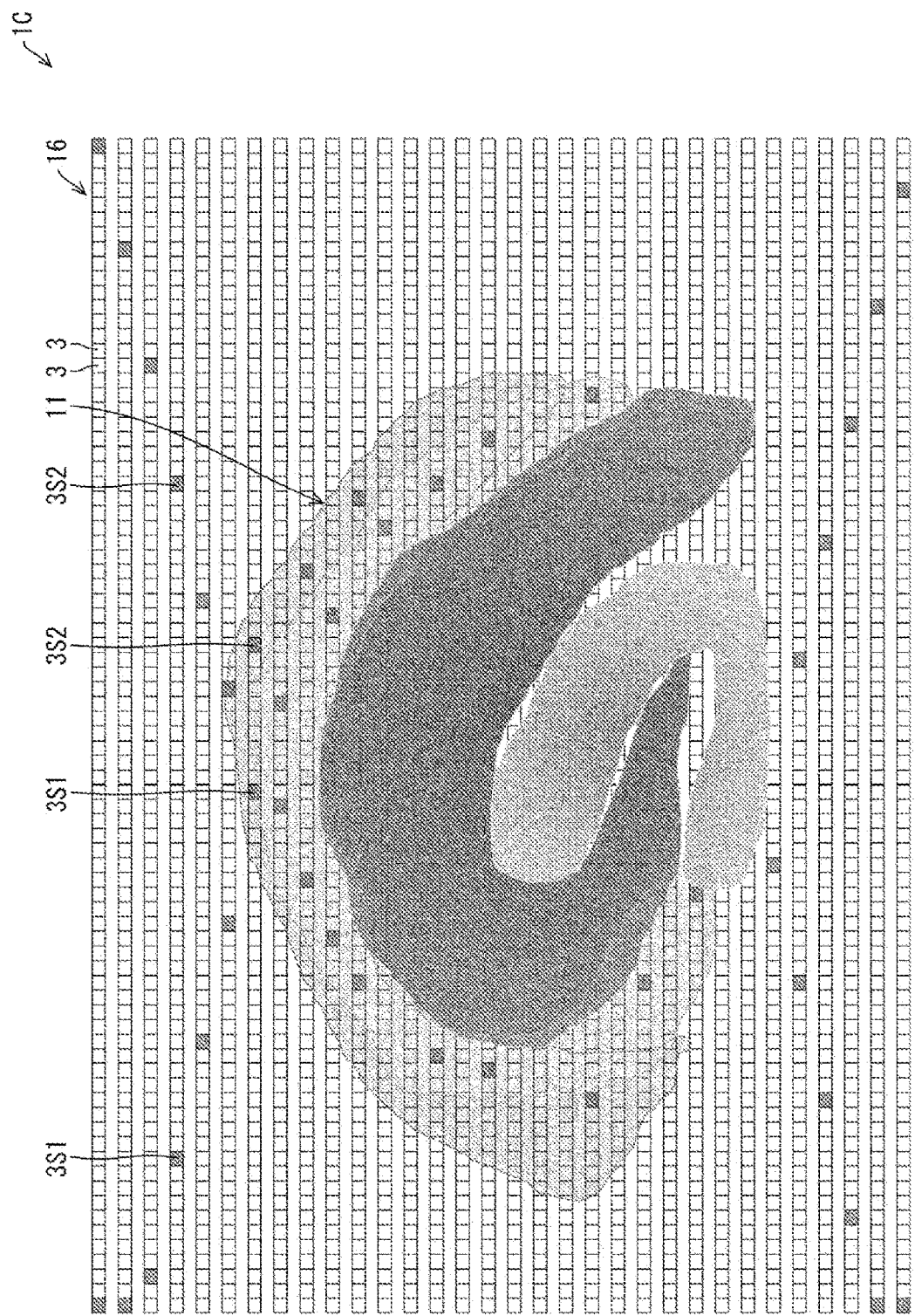
FIG. 16 is a diagram illustrating a positional relationship between selected electrodes of the cell signal measurement electrode plate and the observation sample.

FIG. 16 is a diagram illustrating a positional relationship between the observation sample 11 and the selected electrodes 3S1 and 3S2 of the cell signal measurement electrode plate 1C according to the third embodiment.

In FIG. 16, a vertical partition line is drawn in bold in the grid representing the microelectrode array 16, and the grid is divided into the first divided lines 13 and the second divided lines 14 by the partition line. One of each of the selected electrodes 3S1 and 3S2 on the left and right of the partition line may be selected in the same row of the electrodes 3 arranged in the matrix shape of the microelectrode array 16.

With the number of terminals 10 being defined as 64, in the first embodiment, the terminals 10 can select the electrodes 3 in 64 rows in the vertical direction. However, in the present embodiment, since two of the selected electrodes 3S can be selected in the same row, two terminals are assigned to the same row. Therefore, the terminals 10 can select the electrodes 3 in 32 rows in the vertical direction, which is half the number of the first embodiment.

Thus, the common wiring lines are arranged in parallel with the second selection lines 7, and each of the common wiring lines is divided into the first divided line 13 and the second divided line 14. In the first divided line 13, a plurality of the electrodes 3 arranged on one side, among the plurality of electrodes 3 arranged in one row, are commonly connected via each of the selection circuits 5. In the second divided line 14, a plurality of the electrodes 3 arranged on the other side, among the plurality of electrodes 3 arranged in the one row, are commonly connected via each of the selection circuits 5.

Modified Example of Third Embodiment

Figure 17:
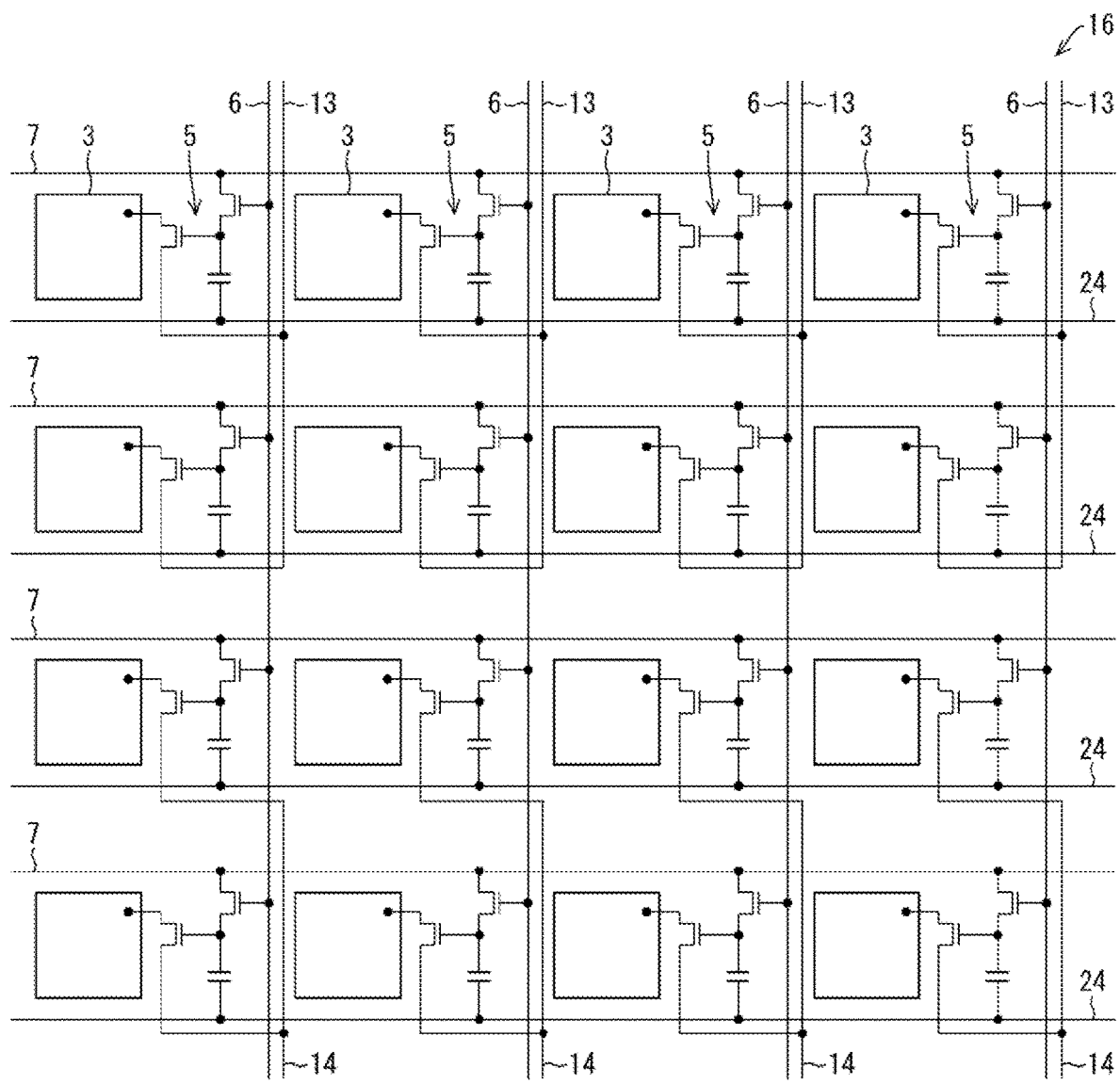
FIG. 17 is a circuit diagram of a microelectrode array according to a modified example of the third embodiment.

FIG. 17 is a circuit diagram of the microelectrode array 16 according to a modified example of the third embodiment.

The present embodiment is similar to the third embodiment, except that the first divided lines 13 and the second divided lines 14 divide the electrodes 3 in the matrix shape of the microelectrode array 16 into two identical columns in the vertical direction.

Thus, the common wiring lines may be arranged in parallel with the first selection lines 6. In this case, each of the common wiring lines is divided into the first divided line 13 and the second divided line 14. In the first divided line 13, a plurality of the electrodes 3 arranged on one side, among the plurality of electrodes 3 arranged in one column, are commonly connected via each of the selection circuits 5. In the second divided line 14, a plurality of the electrodes 3 arranged on the other side, among the plurality of electrodes 3 arranged in the one column, are commonly connected via each of the selection circuits 5.

Fourth Embodiment

Another embodiment of the disclosure will be described below. Note that, for convenience of description, members having the same functions as those of the members described in the above-described embodiment will be denoted by the same reference numerals and signs, and the description thereof will not be repeated.

Figure 18:
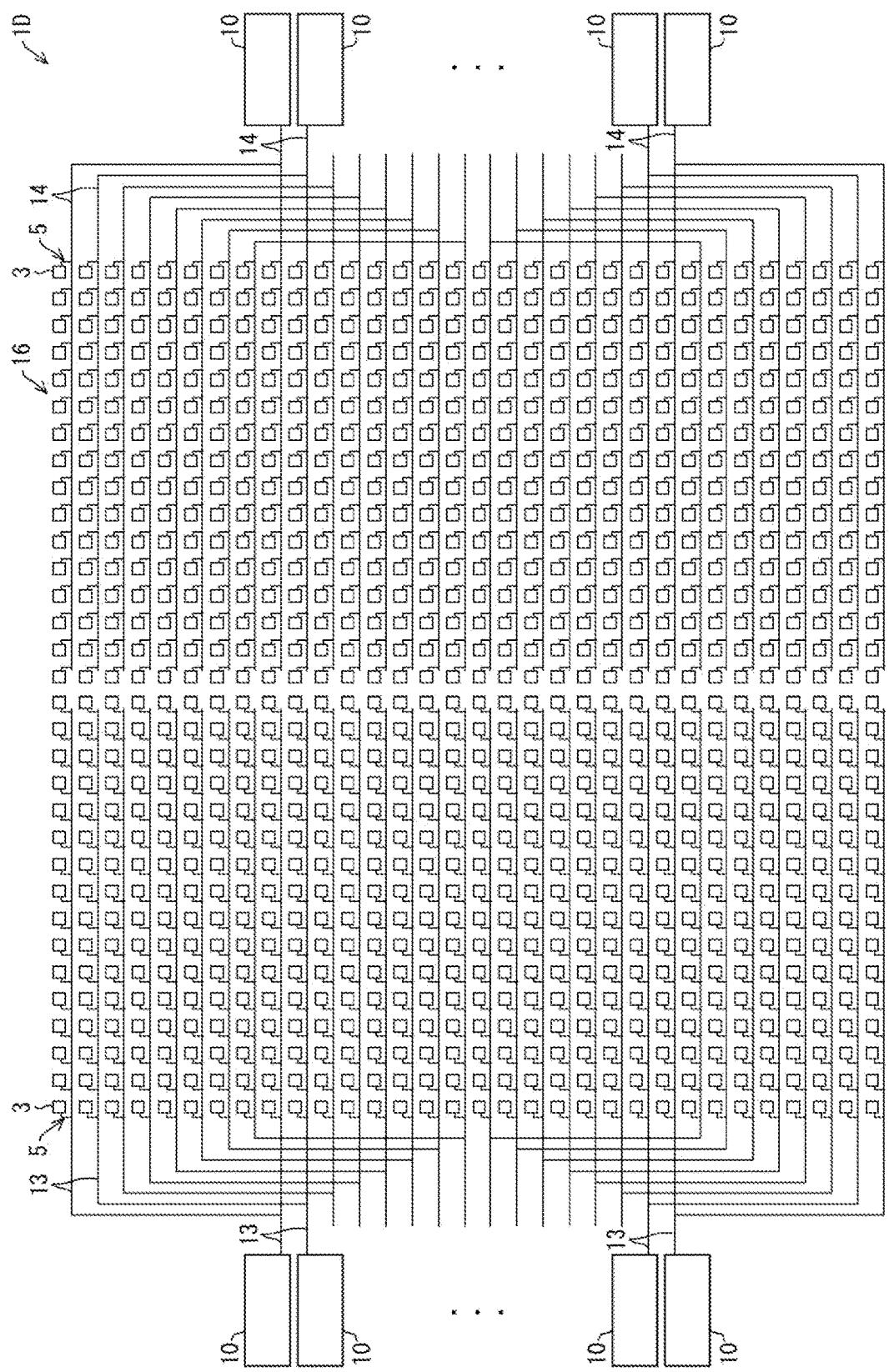
FIG. 18 is a schematic diagram of a circuit in a cell signal measurement electrode plate according to a fourth embodiment.

FIG. 18 is a schematic diagram of a circuit in a cell signal measurement electrode plate 1D according to a fourth embodiment.

The schematic diagram illustrated in FIG. 18 describes a case where 32 of the selected electrodes 3S1 and 3S2 are selected from the electrodes 3 of the microelectrode array 16 in an array including 32 vertical columns and 32 horizontal rows, a stimulation signal is supplied to the observation sample 11, and the cell potential signal is measured.

The number of each of the first divided lines 13 and the second divided lines 14 is 32.

In the cell signal measurement electrode plate 1D, the first divided lines 13 and the second divided lines 14 are paired. Pairing refers to a configuration in which the electrodes 3 arranged in the first horizontal row and the electrodes 3 arranged in another horizontal row among the electrodes 3 of the matrix shape of the microelectrode array 16 are connected to form the first divided lines 13 and the second divided lines 14 as one pair of two rows.

Figure 19:
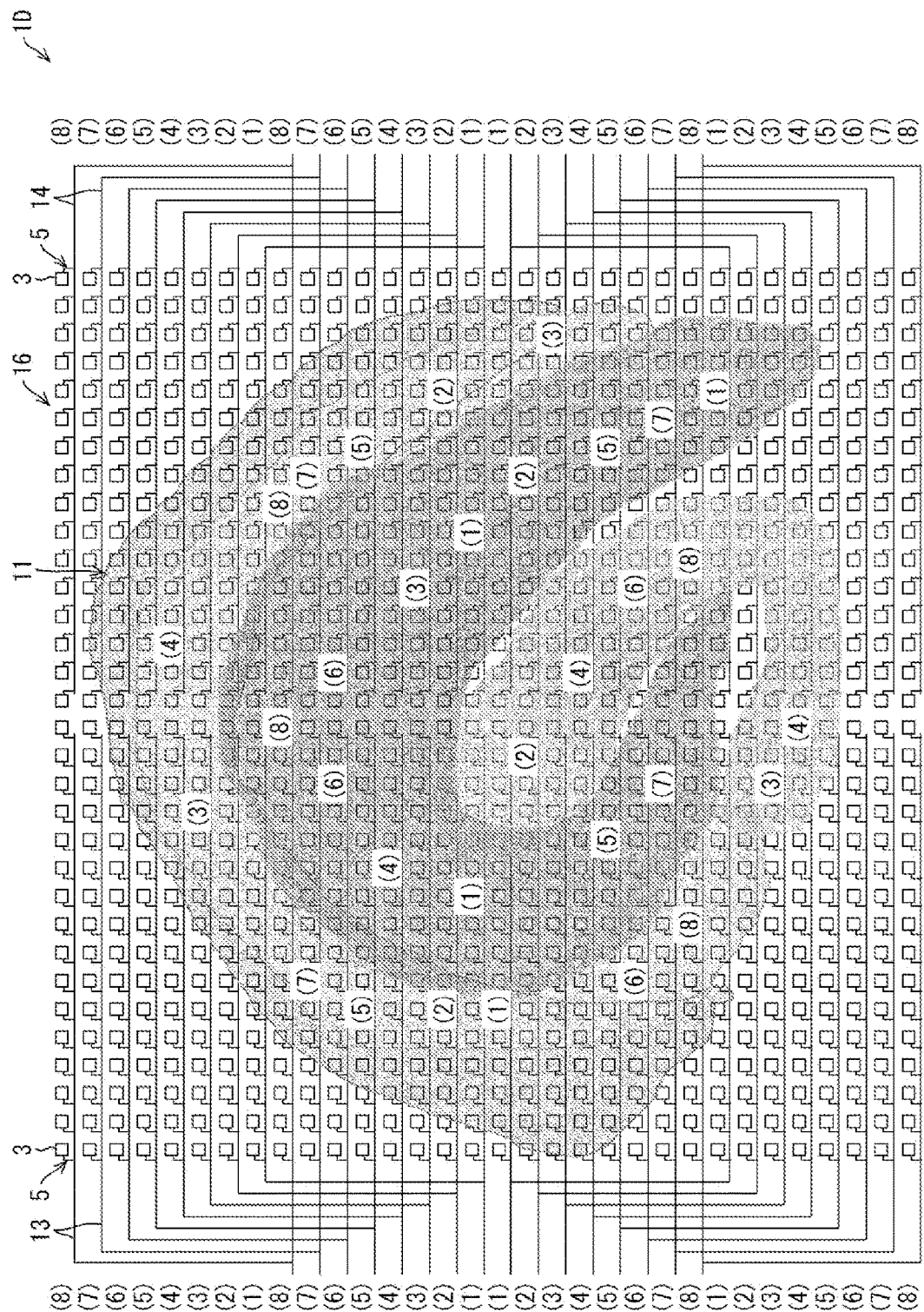
FIG. 19 is a diagram illustrating a positional relationship between selected electrodes of the cell signal measurement electrode plate and the observation sample.

In FIG. 19, numbers from (1) to (8) are indicated vertically. The first divided lines 13 and the second divided lines 14 having the same numbers are paired.

With such a configuration, the selected electrodes 3S1 and 3S2 can be selected from only one selected row among the two rows forming the one pair.

FIG. 19 illustrates a positional relationship between the observation sample 11 and the selected electrodes 3S1 and 3S2 of the cell signal measurement electrode plate 1D according to the fourth embodiment.

The observation sample 11 is arranged in the entire measurement region of the microelectrode array 16. In this case, 32 of the selected electrodes 3S1 and 3S2 may be selected in the entire measurement region.

Figure 20:
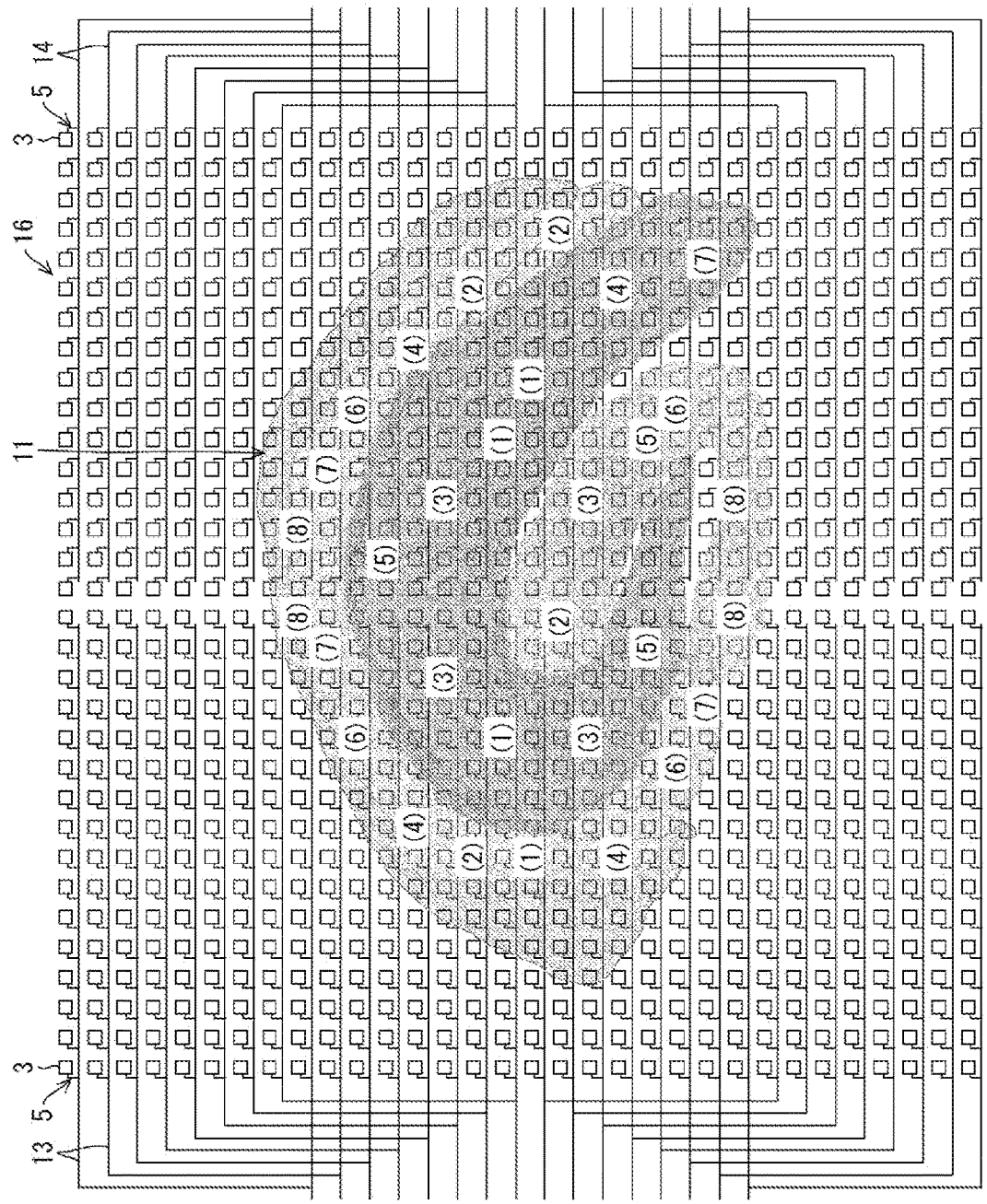
FIG. 20 is a diagram illustrating a positional relationship between other selected electrodes of the cell signal measurement electrode plate and another observation sample.

FIG. 20 is a diagram illustrating a positional relationship between the observation sample 11 being another sample, and other ones of the selected electrodes 3S1 and 3S2 of the cell signal measurement electrode plate 1D according to the fourth embodiment.

The other observation sample 11 is arranged near the center of the measurement region of the microelectrode array 16, and the electrodes 3 in an upper portion and the electrodes 3 in a lower portion of the microelectrode array 16 are not used. In this case, 32 of the selected electrodes 3S1 and 3S2 can be selected near the center of the measurement area.

By pairing one of the first divided lines 13 and one of the second divided lines 14 into one pair, it is possible to select any one of the first divided line 13 and the second divided line 14 being the two lines in the pair, in accordance with the size of the observation sample 11.

Thus, the pairing of the first divided line 13 and the second divided line 14 may change a range of the arrangement of the selected electrodes 3S1 and 3S2, in accordance with the size of the observation sample 11.

Therefore, the first divided lines 13 and the second divided lines 14 are arranged in parallel with the second selection lines 7. Subsequently, one of the first divided lines 13 and another one of the first divided lines 13 are connected, and the cell signal is read from any one electrode from among the plurality of electrodes 3 included in a row corresponding to the one of the first divided lines 13 and another row corresponding to the other one of the first divided lines 13.

The first divided lines 13 and the second divided lines 14 may also be arranged in parallel with the first selection lines 6.

First Modified Example of Fourth Embodiment

Figure 21:
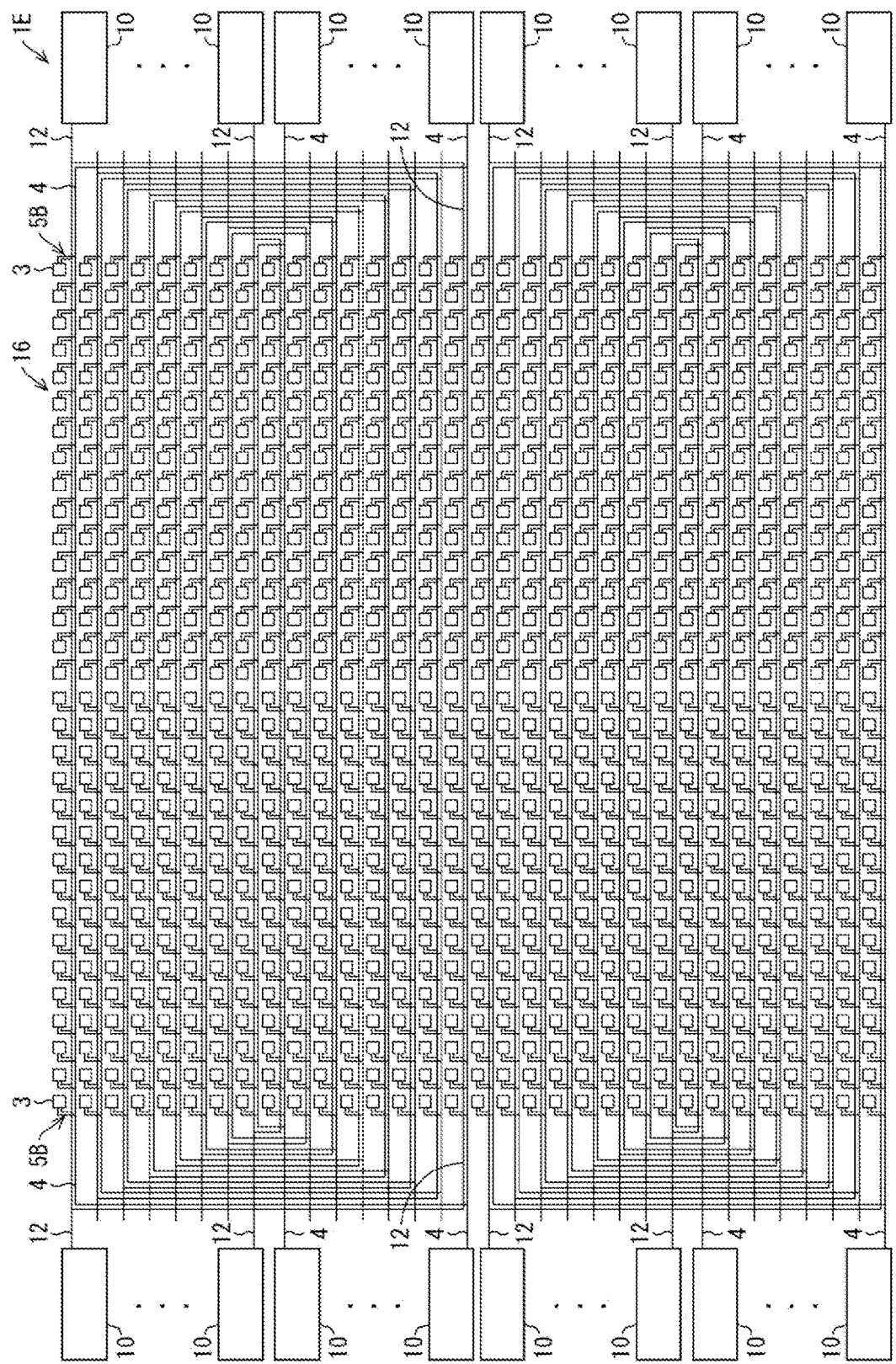
FIG. 21 is a schematic diagram of a circuit of a cell signal measurement electrode plate according to a modified example of the fourth embodiment.

FIG. 21 is a schematic diagram of a circuit of a cell signal measurement electrode plate 1E according to a first modified example of the fourth embodiment.

In the cell signal measurement electrode plate 1E, each of the common wiring lines 4 connected to the selection circuits 5B of the electrodes 3 is paired with another one of the common wiring lines 4.

Furthermore, in the cell signal measurement electrode plate 1E, each of the common wiring lines 12 connected to the selection circuits 5B of the electrodes 3 is paired with another one of the common wiring lines 12.

The cell signal measurement electrode plate 1E includes 32 of the terminals 10 on each of the left and right of the microelectrode array 16.

The terminals 10 of the same row on the left and right of the microelectrode array 16 are connected via the common wiring lines 4 and 12. The cell potential signal detected by the selected electrodes 3S1 and 3S2 can be detected by the terminals 10 on both the left and the right.

The observer attempting to detect the cell potential signal may select one group of the terminals 10 from among the groups of the terminals 10 on the left and right, and thus, it is possible to improve the convenience of the measurement.

Figure 22:
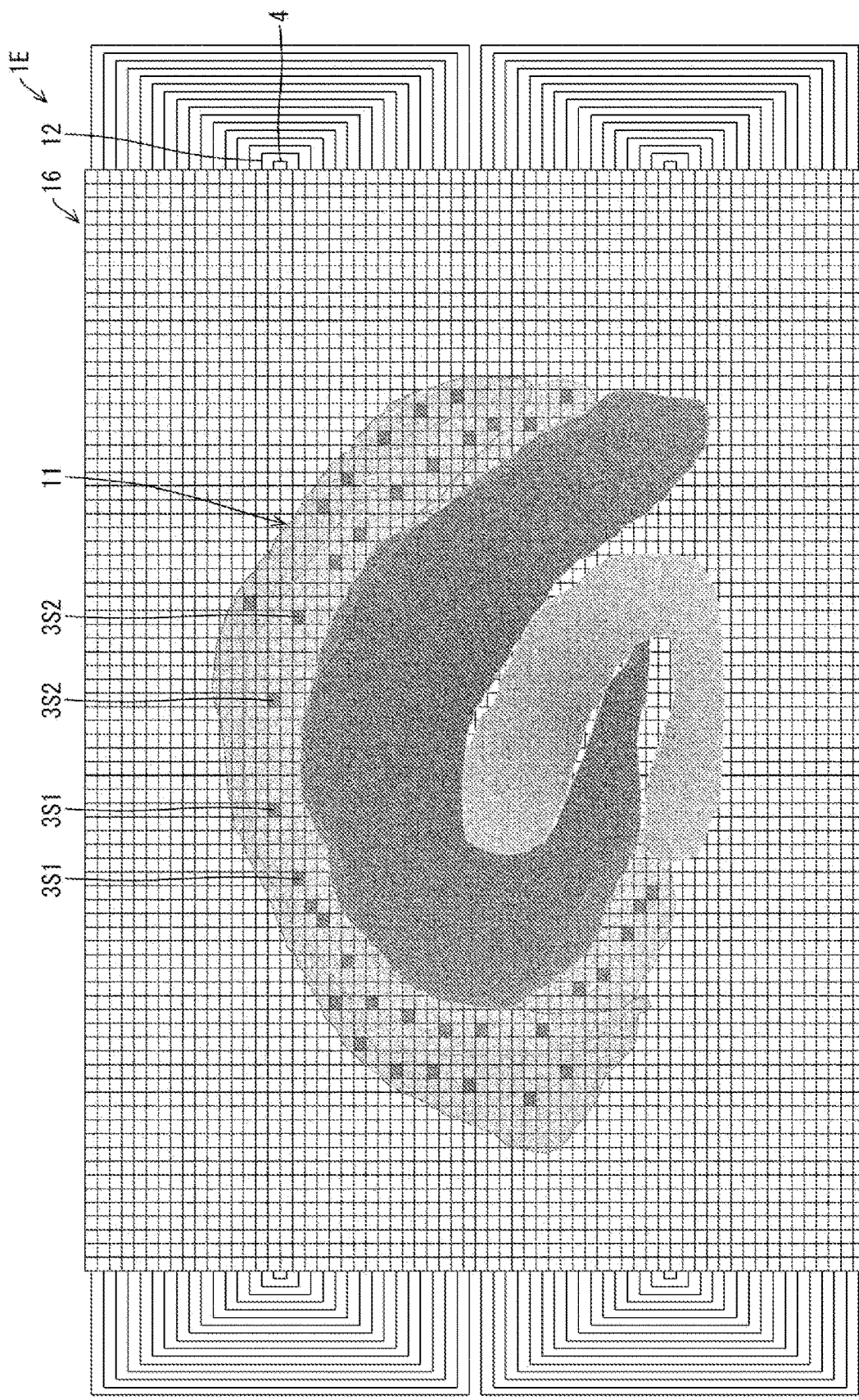
FIG. 22 is a diagram illustrating a positional relationship between selected electrodes of the cell signal measurement electrode plate and the observation sample.

FIG. 22 is a diagram illustrating a positional relationship between the observation sample 11 and the selected electrodes 3S1 and 3S2 of the cell signal measurement electrode plate 1E according to the first modified example of the fourth embodiment.

By pairing the common wiring lines 4 and 12, it is possible to change a range in which the selected electrodes 3S1 and 3S2 are arranged, in accordance with the size of the observation sample 11.

Thus, the observer can further precisely adjust the measurement position of the observation sample 11 when the selected electrodes 3S1 and 3S2 are aligned with a desired measurement position of the observation sample 11.

Second Modified Example of Fourth Embodiment

Figure 23:
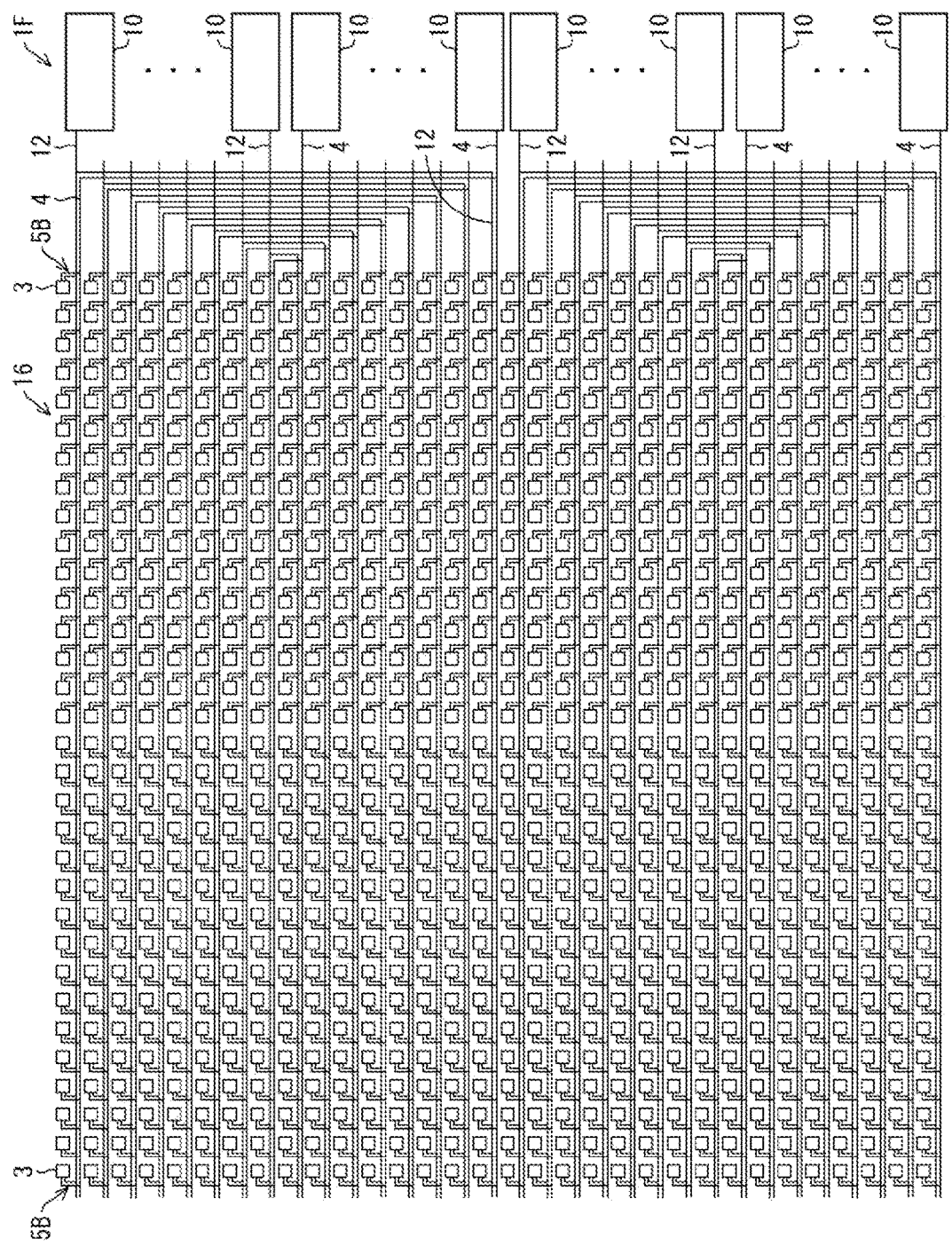
FIG. 23 is a schematic diagram of a circuit of a cell signal measurement electrode plate according to another modified example of the fourth embodiment.

FIG. 23 is a circuit diagram of a cell signal measurement electrode plate 1F according to another modified example of the fourth embodiment.

In the cell signal measurement electrode plate 1F, each of the common wiring lines 4 connected to the selection circuits 5B of the electrodes 3 is paired with another one of the common wiring lines 4.

Furthermore, in the cell signal measurement electrode plate 1F, each of the common wiring lines 12 connected to the selection circuits 5B of the electrodes 3 is paired with another one of the common wiring lines 12.

The cell signal measurement electrode plate 1F includes 32 of the terminals 10 on the right side of the microelectrode array 16.

In the cell signal measurement electrode plate 1F, it is possible to select two of the selected electrodes 3S1 and 3S2 from among the electrodes 3 arranged in the same horizontal row of the microelectrode array 16.

Figure 24:
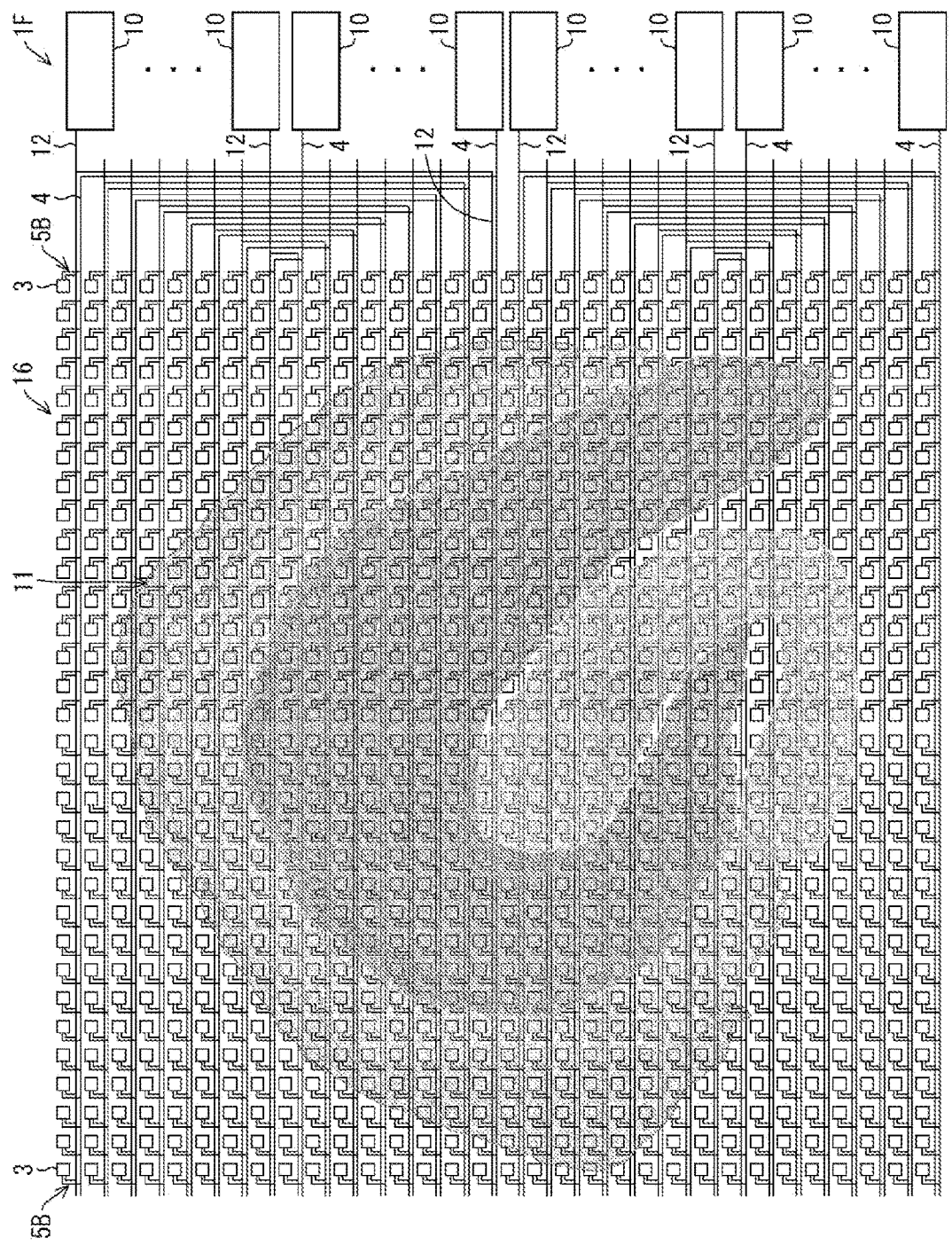
FIG. 24 is a diagram illustrating a positional relationship between selected electrodes of the cell signal measurement electrode plate and the observation sample.

FIG. 24 is a diagram illustrating a positional relationship between the observation sample 11 and the selected electrodes 3S1 and 3S2 of the cell signal measurement electrode plate 1F according to the other modified example of the fourth embodiment.

Figure 25:
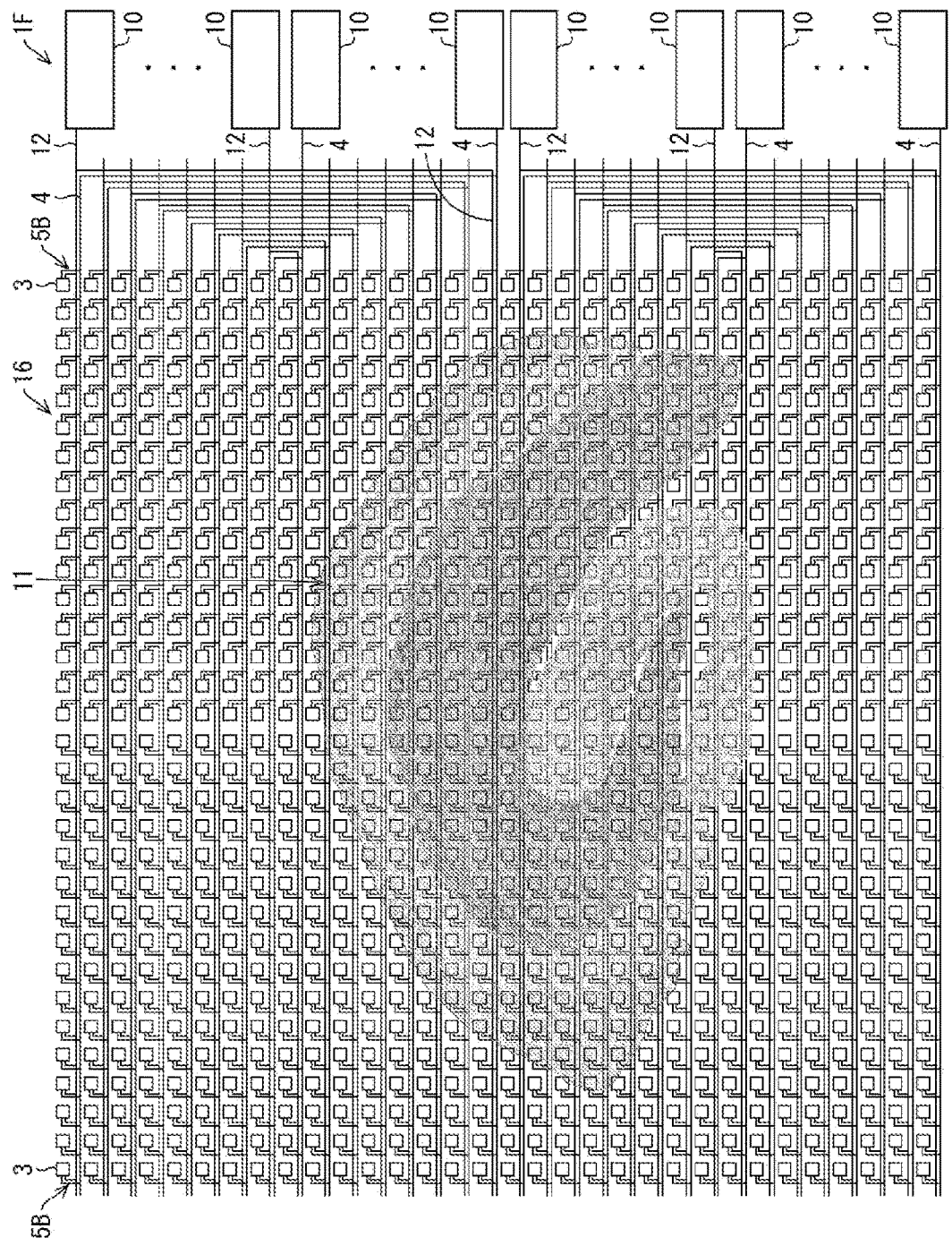
FIG. 25 is a diagram illustrating a positional relationship between other selected electrodes of the cell signal measurement electrode plate and another observation sample.

FIG. 25 is a diagram illustrating a positional relationship between the observation sample 11 being another sample and other ones of the selected electrodes 3S1 and 3S2 of the cell signal measurement electrode plate 1F according to the other modified example of the fourth embodiment.

As illustrated in FIG. 24, when the observation sample 11 is arranged in the entire measurement region, the selected electrodes 3S1 and 3S2 are arranged in the entire region of the microelectrode array 16.

As illustrated in FIG. 25, when the other observation sample 11 is arranged only in a center of the measurement region, the selected electrodes 3S1 and 3S2 are arranged only in a center portion of the microelectrode array 16.

Thus, the observer can further precisely adjust the measurement position of the observation sample 11 when the selected electrodes 3S1 and 3S2 are aligned with a desired measurement position of the observation sample 11.

Third Modified Example of Fourth Embodiment

Figure 26:
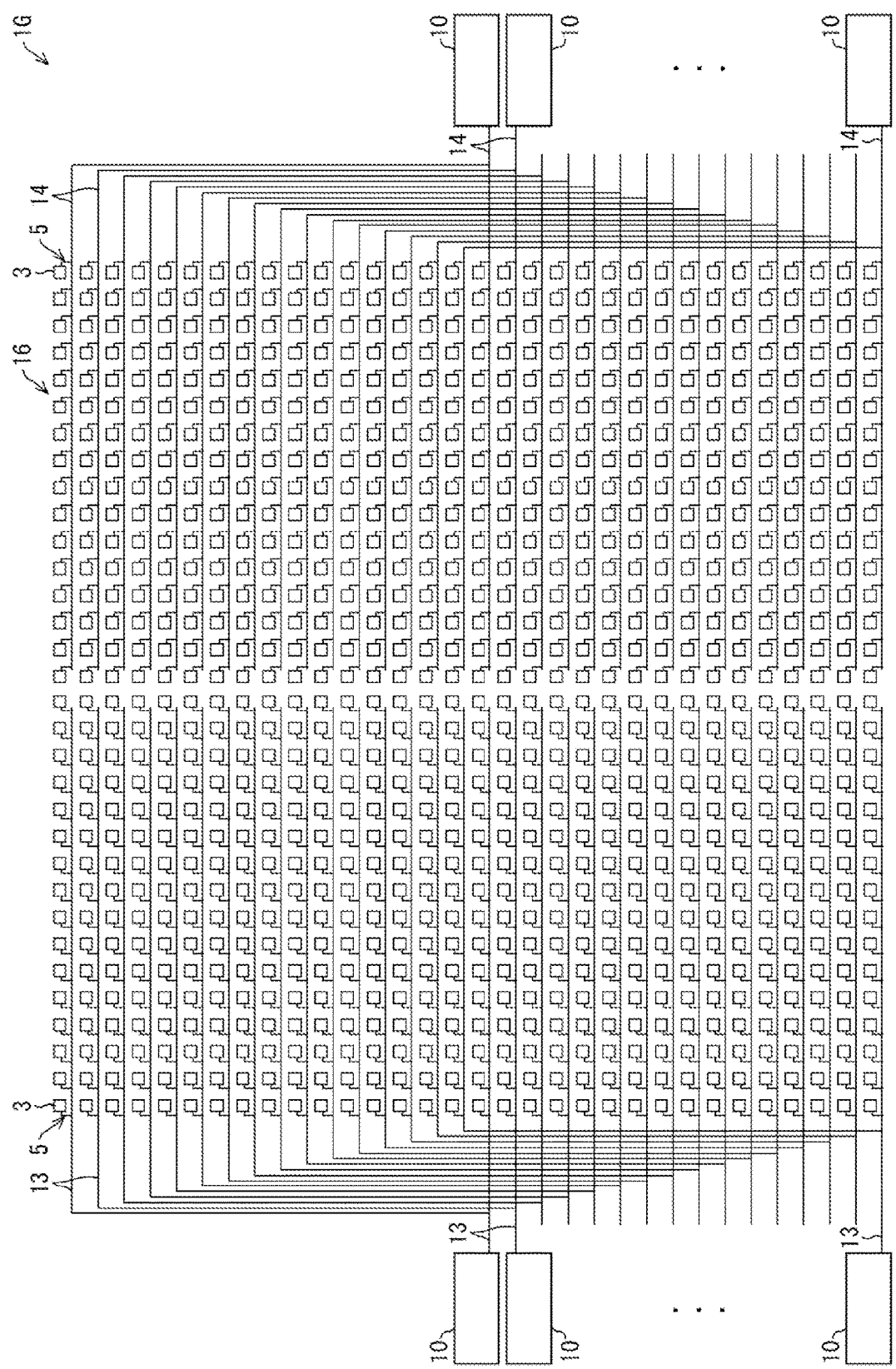
FIG. 26 is a schematic diagram of a circuit of a cell signal measurement electrode plate according to still another modified example of the fourth embodiment.

FIG. 26 is a schematic view of a circuit of a cell signal measurement electrode plate 1G according to a third modified example of the fourth embodiment.

In the third modified example of the fourth embodiment, connection positions of the pairing between the first divided lines 13 and the second divided lines 14 are different from those in the fourth embodiment described above in FIG. 18.

The terminals 10 are arranged at a lower half side of the measurement region. In the fourth embodiment, the terminals 10 are arranged in the center of the measurement region, and the observation sample 11 is aligned with the center.

On the other hand, in the third modified example of the fourth embodiment, the selected electrodes 3S1 and 3S2 can be arranged by aligning the observation sample 11 to a bottom side.

Supplement

Cell signal measurement electrode plates 1, 1A, 1B, 1C, 1D, 1E, 1F, and 1G according to a first aspect of the disclosure include a substrate 2, a plurality of first selection lines 6 and 23 provided on the substrate 2 and extending in a column direction, a plurality of second selection lines 7 provided on the substrate 2 and extending in a row direction, a plurality of selection circuits 5, 5A, and 5B and a plurality of electrodes 3 provided on the substrate 2 to read a cell signal emitted from cells (an observation sample) and arranged in a matrix shape in a portion where the plurality of first selection lines 6 and 23 and the plurality of second selection lines 7 intersect each other, and a plurality of common wiring lines 4 and 12 arranged in parallel with any one of the second selection lines 7 and the first selection lines 6 and 23 to read the cell signal and each connected via the selection circuits 5, 5A, and 5B to one row or one column of the plurality of electrodes 3 arranged in the matrix shape. The selection circuits 5, 5A, and 5B each include one or more unit selection circuits. The unit selection circuit includes a first transistor T1, a second transistor T2, and a capacitance element (a first capacitor C1). A gate terminal of the first transistor T1 is connected to the first selection lines 6 and 23 and a source terminal of the first transistor T1 is connected to the second selection line 7. A gate terminal of the second transistor T2 is connected to a drain terminal of the first transistor T1, a source terminal of the second transistor T2 is connected to one of the electrodes 3, and a drain terminal of the second transistor T2 is connected to the common wiring lines 4 and 12. One capacitance electrode of the capacitance element is connected to the drain terminal of the first transistor T1 and the other capacitance electrode of the capacitance element is connected to a wiring line for fixing a constant potential (a capacitance element potential fixing wiring line 24).

According to such a characteristic, the plurality of selection circuits arranged in a matrix shape in a portion where the plurality of first selection lines and the plurality of second selection lines intersect each other, each include a first transistor, a second transistor, and a capacitance element. A gate terminal of the first transistor is connected to a corresponding one of the first selection lines and a source terminal of the first transistor is connected to a corresponding one of the second selection lines. A gate terminal of the second transistor is connected to a drain terminal of the first transistor, a source terminal of the second transistor is connected to an electrode, and a drain terminal of the second transistor is connected to a common wiring line. One capacitance electrode of the capacitance element is connected to the drain terminal of the first transistor and the other capacitance electrode of the capacitance element is connected to a wiring line for fixing a constant potential.

Thus, by synchronously supplying clock signals to the first selection lines and the second selection lines, it is possible to select an electrode that conducts with the common wiring line from among the plurality of electrodes arranged in the matrix shape.

As a result, it is possible to place an electrode at a measurement location where cells are to be measured, or in the vicinity of the measurement location, by a simple configuration.

In the cell signal measurement electrode plates 1, 1A, 1B, 1C, 1D, 1E, 1F, and 1G according to a second aspect of the disclosure, the substrate 2 is a transparent substrate in the first aspect described above.

According to such a configuration, since a sample can be observed through the substrate from below the substrate by an inverted microscope or the like, it is possible to accurately grasp the positions of the electrodes and the positions of the cells.

In the cell signal measurement electrode plates 1D, 1E, 1F, and 1G according to a third aspect of the disclosure, in the first aspect described above, the plurality of common wiring lines 4 (first divided lines 13 and second divided lines 14) are arranged in parallel with the first selection lines 6 or the second selection lines 7, one of the plurality of common wiring lines 4 (the first divided lines 13 and the second divided lines 14) and another one of the plurality of common wiring lines 4 are connected, and the cell signal is read from any one electrode 3 from among the plurality of electrodes 3 included in one row or one column corresponding to the one of the plurality of common wiring lines 4 (the first divided lines 13 and the second divided lines 14) and one other row or one other column corresponding to the other one of the plurality of common wiring lines 4 (the first divided lines 13 and the second divided lines 14).

According to such a configuration, it is possible to concentrate electrodes that conduct with the common wiring line among one row or one column of the plurality of electrodes arranged in the matrix shape, in a center of the matrix including the electrodes.

In the cell signal measurement electrode plates 1C, 1D, and 1G according to a fourth aspect of the disclosure, in the first aspect described above, the plurality of common wiring lines 4 are arranged in parallel with the first selection lines 6 or the second selection lines 7, and each of the common wiring lines 4 is divided into a first divided common wiring line (the first divided line 13) and a second divided common wiring line (the second divided line 14). In the first divided common wiring line, a plurality of the electrodes 3 arranged on one side, among the plurality of electrodes 3 arranged in one row or one column, are commonly connected via each of the selection circuits 5. In the second divided common wiring line, a plurality of the electrodes 3 arranged on the other side, among the plurality of electrodes 3 arranged in the one row or the one column, are commonly connected via each of the selection circuits 5.

According to such a configuration, it is possible to increase the number of electrodes that conduct with the common wiring line among one row or one column of the plurality of electrodes arranged in the matrix shape.

In the cell signal measurement electrode plate 1B according to a fifth aspect of the disclosure, in the first aspect described above, each of the selection circuits 5B includes a plurality of unit selection circuits, one of the plurality of unit selection circuits is connected to one (the common wiring line 4) of the plurality of common wiring lines 4 and 12, and another one of the plurality of unit selection circuits is connected to the other one (the common wiring line 12) of the plurality of common wiring lines 4 and 12.

According to such a configuration, it is possible to increase the number of electrodes that conduct with the common wiring line among one row or one column of the plurality of electrodes arranged in the matrix shape.

In the cell signal measurement electrode plate 1A according to a sixth aspect of the disclosure, in the first aspect described above, each of the selection circuits 5A further includes a noise cut filter (low-pass filter 22) for removing a noise of the cell signal, the noise cut filter being arranged in a region from the drain of the second transistor T2 to the terminal 10 via the common wiring line 4.

According to such a configuration, it is possible to remove a high-frequency noise overlapping a weak cell signal that is read from the electrode via the second transistor and supplied to the common wiring line.

The cell signal measurement electrode plates 1, 1A, 1B, 1C, 1D, 1E, 1F, and 1G according to a seventh aspect of the disclosure further include, in the first aspect described above, a column selection driver (gate driver 8) that selects one of the plurality of first selection lines 6 and 23 and a row selection driver (source driver 9) that selects one of the plurality of second selection lines 7.

According to such a configuration, it is possible to simultaneously supply, to the first selection lines and the second selection lines, the clock signal for selecting an electrode that conducts with the common wiring line among the plurality of electrodes arranged in the matrix shape.

In the cell signal measurement electrode plates 1, 1A, 1B, 1C, 1D, 1E, 1F, and 1G according to an eighth aspect of the disclosure, in the first aspect described above, the cell signal from the cells is read via the common wiring lines (4 and 12) and a first electrode (selected electrodes 3S, 3S1, and 3S2) being the electrode 3 connected to the unit selection circuit selected by the first selection lines 6 and 23 and the second selection lines 7.

According to such a configuration, it is possible to read the cell signal from a measurement location where the cells are to be measured.

In the cell signal measurement electrode plates 1, 1A, 1B, 1C, 1D, 1E, 1F, and 1G according to a ninth aspect of the disclosure, in the eighth aspect described above, a stimulation signal to be given to the cells is supplied from an external circuit, via the common wiring lines 4 and 12 connected to the unit selection circuits selected by the first selection lines 6 and 23 and the second selection lines 7, to second electrodes being electrodes 3 connected to the unit selection circuits.

According to such a configuration, it is possible to supply the stimulation signal to a desired location of the cells.

An information processing device (cell signal detection system 15) according to a tenth aspect of the disclosure includes the cell signal measurement electrode plates 1, 1A, 1B, 1C, 1D, 1E, 1F, and 1G described in any one of the aspects 1 to 9.

The disclosure is not limited to each of the embodiments described above, and various modifications may be made within the scope of the claims. Embodiments obtained by appropriately combining technical approaches disclosed in each of the different embodiments also fall within the technical scope of the disclosure. Furthermore, novel technical features can be formed by combining the technical approaches disclosed in each of the embodiments.

The invention claimed is:

1. A cell signal measurement electrode plate comprising:
   a substrate;
   a plurality of first selection lines provided on the substrate and extending in a column direction;
   a plurality of second selection lines provided on the substrate and extending in a row direction;
   a plurality of selection circuits and a plurality of electrodes, the plurality of selection circuits and the plurality of electrodes being configured to read a cell signal emitted from a cell, being provided on the substrate, and being arranged in a matrix shape in a portion where the plurality of first selection lines and the plurality of second selection lines intersect each other; and
   a plurality of common wiring lines configured to read the cell signal, arranged in parallel with any one of the plurality of second selection lines and the plurality of first selection lines, and each connected via a selection circuit of the plurality of selection circuits to one row or one column of the plurality of electrodes arranged in the matrix shape,
   wherein each of the plurality of selection circuits includes one or more unit selection circuits, and
   the one or more unit selection circuits each include
      a first transistor including a gate terminal connected to a first selection line of the plurality of first selection lines, and a source terminal connected to a second selection line of the plurality of second selection lines,
      a second transistor including a gate terminal connected to a drain terminal of the first transistor, a source terminal connected to an electrode of the plurality of electrodes, and a drain terminal connected to a common wiring line of the plurality of common wiring lines, and
      a capacitance element including one capacitance electrode connected to the drain terminal of the first transistor and another capacitance electrode connected to a wiring line configured to fix a constant potential.

2. The cell signal measurement electrode plate according to claim 1,
   wherein the substrate is a transparent substrate.

3. The cell signal measurement electrode plate according to claim 1,
   wherein the plurality of common wiring lines are arranged in parallel with the plurality of first selection lines or the plurality of second selection lines,
   one of the plurality of common wiring lines and another one of the plurality of common wiring lines are connected to each other, and
   the cell signal is read from any one electrode from among a plurality of electrodes included in one row or one column corresponding to the one of the plurality of common wiring lines and one other row or one other column corresponding to the another one of the plurality of common wiring lines.

4. The cell signal measurement electrode plate according to claim 1,
   wherein the plurality of common wiring lines are arranged in parallel with the plurality of first selection lines or the plurality of second selection lines, and
   each of the plurality of common wiring lines is divided into a first divided common wiring line having a plurality of electrodes arranged on one side, among a plurality of electrodes arranged in one row or one column, that are commonly connected via each of the plurality of selection circuits, and a second divided common wiring line having a plurality of electrodes arranged on the other side, among the plurality of electrodes arranged in the one row or the one column, that are commonly connected via each of the plurality of selection circuits.

5. The cell signal measurement electrode plate according to claim 1,
   wherein each of the plurality of selection circuits includes a plurality of unit selection circuits,
   one of the plurality of unit selection circuits is connected to one of the plurality of common wiring lines, and
   another one of the plurality of unit selection circuits is connected to another one of the plurality of common wiring lines.

6. The cell signal measurement electrode plate according to claim 1,
   wherein each of the plurality of selection circuits further includes a noise cut filter configured to remove a noise of the cell signal, the noise cut filter being arranged in a region from a drain of the second transistor to an output terminal via a common wiring line of the plurality of common wiring lines, the output terminal being a terminal for detecting the cell signal and connected to the common wiring line.

7. The cell signal measurement electrode plate according to claim 1, further comprising:
   a column selection driver configured to select one of the plurality of first selection lines; and a row selection driver configured to select one of the plurality of second selection lines.

8. The cell signal measurement electrode plate according to claim 1,
wherein the cell signal from the cell is read via a common wiring line of the plurality of common wiring lines and a first electrode being one of the plurality of electrodes connected to the plurality of unit selection circuits selected by the plurality of first selection lines and the plurality of second selection lines.

9. The cell signal measurement electrode plate according to claim 8,
wherein a stimulation signal to be given to the cell is supplied from an external circuit, via a common wiring line of the plurality of common wiring lines connected to a unit selection circuit of the plurality of unit selection circuits selected by the plurality of first selection lines and the plurality of second selection lines, to a second electrode being one of the plurality of electrodes connected to a unit selection circuit of the plurality of unit selection circuits.

10. An information processing device comprising:
the cell signal measurement electrode plate according to claim 1.

* * * * *